US012095942B2

(12) United States Patent
Okhrimenko

(10) Patent No.: US 12,095,942 B2
(45) Date of Patent: *Sep. 17, 2024

(54) METHOD AND APPARATUS FOR DETECTING SMS PARAMETER MANIPULATION

(71) Applicant: AB Handshake Corporation, Miami, FL (US)

(72) Inventor: Sergei Okhrimenko, St. Petersburg (RU)

(73) Assignee: AB Handshake Corporation, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,025

(22) Filed: Oct. 18, 2021

(65) Prior Publication Data

US 2022/0070301 A1  Mar. 3, 2022

Related U.S. Application Data

(63) Continuation-in-part of application No. 17/077,718, filed on Oct. 22, 2020, now Pat. No. 11,297,189.
(Continued)

(51) Int. Cl.
*H04M 15/00* (2006.01)
*H04M 3/42* (2006.01)
*H04Q 3/00* (2006.01)

(52) U.S. Cl.
CPC ....... *H04M 15/47* (2013.01); *H04M 3/42297* (2013.01); *H04M 15/41* (2013.01); *H04Q 3/005* (2013.01); *H04M 2215/0148* (2013.01)

(58) Field of Classification Search
CPC combination set(s) only.
See application file for complete search history.

(56) References Cited

U.S. PATENT DOCUMENTS 7,024,161 B1 * 4/2006 LaMedica, Jr. ....... H04W 24/00
455/67.11
8,204,798 B1 * 6/2012 Barbeau ................ G06F 3/1239
705/26.8
(Continued)

FOREIGN PATENT DOCUMENTS

CN     108810900 A    11/2018
KR     100967604 B1    7/2010
WO     2018/144745 A1   8/2018

OTHER PUBLICATIONS

TRANSNEXUS website "Stir/Shaken overview", URL: https://transnexus.com/whitepapers/stir-and-shaken-overview/, Dec. 2018.
(Continued)

*Primary Examiner* — Phung-Hoang J Nguyen
(74) *Attorney, Agent, or Firm* — Sunstein LLP

(57) ABSTRACT

System and method for detecting SMS parameters manipulation. A first SMS registry is coupled to a first Short Message Service Center (SMSC) and optionally to other SMS registries. The first SMSC is within a terminating telephone network. The first SMS registry receives first and second information about an SMS message that was sent from another telephone network or from an External Short Messaging Entity (ESME) and is destined to the first SMSC. The first and second information represent status of the SMS message respectively before and after the SMS message enters the terminating telephone network. The first SMS registry or a firewall automatically compares at least corresponding portions of the first and second information. As a result of the comparison, in response to detecting a difference between the at least portions of the first and second information, the first SMS registry automatically sends a signal indicating SMS parameter manipulation.

14 Claims, 15 Drawing Sheets

Related U.S. Application Data which is a continuation-in-part of application No. 17/068,963, filed on Oct. 13, 2020, now Pat. No. 11,196,873, which is a continuation of application No. 17/011,336, filed on Sep. 3, 2020, now Pat. No. 10,951,775.

(56) References Cited

U.S. PATENT DOCUMENTS

| | | | |
|---|---|---|---|
| 8,712,385 B2* | 4/2014 | Young | H04W 4/12 |
| | | | 455/518 |
| 8,729,586 B2 | 5/2014 | Wu et al. | |
| 9,471,932 B2 | 10/2016 | Kawecki, III | |
| 9,762,731 B1 | 9/2017 | Cohen | |
| 10,021,541 B2* | 7/2018 | Joseph | H04W 4/14 |
| 10,182,034 B1 | 1/2019 | Koster | |
| 10,482,531 B2 | 11/2019 | Drotos et al. | |
| 10,762,723 B1 | 9/2020 | Zhou | |
| 10,805,462 B1 | 10/2020 | Ginter et al. | |
| 10,951,775 B1 | 3/2021 | Okhrimenko | |
| 11,057,749 B2* | 7/2021 | Lee | H04W 88/184 |
| 11,109,198 B2* | 8/2021 | Yang | H04W 76/28 |
| 11,159,921 B2* | 10/2021 | Wong | H04W 8/06 |
| 2003/0118164 A1* | 6/2003 | Bennett, III | H04M 11/06 |
| | | | 379/93.25 |
| 2004/0202296 A1 | 10/2004 | Dokko | |
| 2008/0026778 A1 | 1/2008 | Cai et al. | |
| 2011/0016363 A1 | 1/2011 | Washio | |
| 2012/0140903 A1 | 6/2012 | Zhang et al. | |
| 2012/0243530 A1 | 9/2012 | Rosenberg et al. | |
| 2013/0095793 A1 | 4/2013 | Nooren | |
| 2013/0260743 A1 | 10/2013 | Wang et al. | |
| 2013/0315386 A1 | 11/2013 | Stachiw et al. | |
| 2017/0244640 A1* | 8/2017 | Lin et al. | H04L 49/25 |
| 2018/0294959 A1 | 10/2018 | Traynor et al. | |
| 2018/0295140 A1 | 10/2018 | Lu et al. | |
| 2019/0007553 A1 | 1/2019 | Noldus et al. | |
| 2019/0037081 A1 | 1/2019 | Rao et al. | |
| 2020/0112636 A1 | 4/2020 | Thomas et al. | |
| 2020/0153877 A1 | 5/2020 | Scivicque | |
| 2021/0168571 A1* | 6/2021 | Tang | H04W 8/18 |
| 2021/0360567 A1* | 11/2021 | Tiwari | H04W 60/04 |
| 2022/0345857 A1* | 10/2022 | Zhang | H04W 4/14 |

OTHER PUBLICATIONS

OKHRIMENKO—"Presented to the Seismic Group GSMA (Global System for Mobile Communications) meeting on Oct. 8, 2019."

OKHRIMENKO—"Presented to RAG (Risk and Assurance Group) conference on May 13, 2020."

International Searching Authority—International Search Report, pertaining to International Application No. PCT/US2022/046573 dated Jan. 20, 2023, together with the Written Opinion of the International Searching Authority, 13 pages.

\* cited by examiner

METHOD AND APPARATUS FOR DETECTING SMS PARAMETER MANIPULATION

PRIORITY

This application is a continuation-in-part of U.S. patent application Ser. No. 17/077,718, filed Oct. 22, 2020, which is a continuation-in-part of U.S. patent application Ser. No. 17/068,963, filed on Oct. 13, 2020, which is a continuation of U.S. patent application Ser. No. 17/011,336, filed on Sep. 3, 2020, now U.S. Pat. No. 10,951,775, issued Mar. 16, 2021. Each of these applications is hereby incorporated herein in its entirety by reference, for all purposes.

TECHNICAL FIELD

The present invention relates to fraud detection in short message service (SMS) messages, and more particularly to the detection of the manipulation of SMS message contents or parameters.

BACKGROUND ART

In the telecommunication environment, voice call communications within interconnected carrier networks are often manipulated for fraudulent purposes, such as to facilitate robocalls or other scams (e.g., Wangiri scam). For example, the call signals for communicating a call may be manipulated to cause Calling Line Identity (CLI) spoofing, short stopping, call stretching, interconnect bypass, private branch exchange (PBX) hack, etc. Present solutions for detecting such call fraud, such as present implementations of Secure Telephone Identity Revisited/Secure Handling of Asserted Information Using Tokens (STIR/SHAKEN), require complex procedures or have other deficiencies that prevent detecting, alerting, and blocking of such fraudulent activities in real-time.

Short Message Service (SMS) is a service primarily, although not exclusively, provided to mobile telephones. SMS messages primarily, although not necessarily exclusively, consist of text. The SMS is typically implemented in a telephone network using a Short Message Service Center (SMSC), which is a network element that acts as a store-and-forward device for SMS messages. The SMSC stores, forwards, converts, and delivers SMS messages. Transmission of short messages between the SMSC and a mobile telephone handset is typically done using the Mobile Application Part (MAP) and/or the CAMEL Application Part (CAP) of the Signaling System 7 (SS7) telecommunication protocol. A device capable of originating an SMS message within a native domain of an SMSC is referred to as a Short Message Entity (SME).

SMS messages are carried primarily via signaling protocols in telephone networks, which constrains their lengths to 1,120 bits (equivalent to 140 8-bit bytes), which are typically encoded as 160 7-bit text characters, although other encoding alphabets may be used. Larger contents can be sent using multiple SMS messages, in which case each message starts with a User Data Header (UDH) that contains segmentation information. However, since the UDH occupies space that would otherwise be part of a message, the number of available characters per segment is reduced, for example to 153 7-bit characters. A receiving handset reassembles the multiple message and presents the reassembled message to a recipient user as one long message.

SMS messages may be sent and received by mobile telephone handsets, i.e., the messages can be mobile originated (MO) and mobile terminated (MT). SMS messages may be sent from one mobile device to another mobile device. In addition, with an appropriate gateway, such as a Gateway Mobile Switching Center (G-MSC), or other connection to an SMSC, mobile devices can send SMS messages to external applications (External Short Messaging Entities or ESME), such as content providers, using transactions referred to as Mobile Originated, Application Terminated (MO-AT). Furthermore, SMS messages can be sent from applications to mobile devices using transactions referred to as Application Originated, Mobile Terminated (AO-MT). For example, via a suitable gateway, an e-mail message may be forwarded to an SMSC for delivery to a mobile device as one or more SMS messages.

Text-enabled fixed-line telephone handsets can receive SMS messages in text format. SMS messages can be delivered to non-text-enabled telephones using text-to-speech conversion. SMS messages can also be used to send binary content, such as ringtones or logos, as well as over-the-air (OTA) programming or configuration data to receiving devices.

For all its utility, the SMS also has some vulnerabilities. For example, in Global Service for Mobile communications (GSM) systems, only air traffic between a Mobile Station (MS) and a Base Transceiver Station (BTS) is encrypted (optionally), and with a weak and broken stream cipher (A5/1 or A5/2). Authentication is unilateral and vulnerable. Although SS7 systems are typically fairly secure, at least within their wired or optical fiber infrastructure, store-and-forward systems are, by their nature, less secure than system that do not store messages.

However, the most significant problem with the SMS is its vulnerability to message parameter alteration. When a sending SME is in a different telephone network from an intended receiving device, in general an SMS message must be routed by one SMSC to another SMSC, via an interconnecting network, such as the Internet, where the SMS message is subject to alteration. Furthermore, a fraudster can fabricate (spoof) SMS messages and inject them into the Internet for delivery by a mobile telephone system.

A fraudster may manipulate address information in an SMS message in order to impersonate a user who has roamed onto a foreign network and has submitted a message destined to the user's home network. Frequently, these messages are addressed to destinations outside the home network, with the home SMSC essentially being "hijacked" to send messages into other networks.

A fraudster may alter or fabricate text of an SMS message and/or address information in the SMS message (collectively "SMS parameters"), such as a sender address (originating mobile number, also referred to as A-number or Sender ID) with an intent to commit a fraud. Exemplary frauds include: SMS originator spoofing, SMSC bypass, spam, artificial inflation of traffic, SMS traffic hijacking, and a number of social engineering frauds, such as smishing (text equivalent of phishing).

In October, 2005, researchers from Pennsylvania State University published an analysis of vulnerabilities in SMS-capable cellular networks. The researchers speculated that attackers might exploit the open functionality of these networks to disrupt them or cause them to fail, possibly on a nationwide scale. Clearly, systems and methods for detecting SMS parameters manipulation would be highly desirable.

SUMMARY OF THE EMBODIMENTS

An embodiment of the present invention provides a system for detecting SMS parameters manipulation. The system includes a first SMS registry. The first SMS registry is configured to be communicably coupled to a first Short Message Service Center (SMSC) disposed in a terminating telephone network. The first SMS registry is configured to receive first information about an SMS message destined to the first SMSC. The first information represents a status of the SMS message before the SMS message enters the terminating telephone network.

The first SMS registry is also configured to receive second information about the SMS message. The second information represents a status of the SMS message after the SMS message enters the terminating telephone network.

The first SMS registry is also configured to automatically compare at least a portion of the first information to a corresponding at least a portion of the second information. As a result of the comparison, in response to detecting a difference between the at least portion of the first information and the corresponding at least portion of the second information, the first SMS registry is configured to automatically send a first signal indicating SMS parameter manipulation.

Optionally, the at least a portion of the first information includes a sending party telephone number.

Optionally, in any embodiment, the at least a portion of the first information includes an identifier of an External Short Messaging Entity (ESME) that initiated the SMS message.

Optionally, in any embodiment, the at least a portion of the first information includes a telephone number of an intended receiving party of the SMS message.

Optionally, in any embodiment, the at least a portion of the first information includes at least a portion of a message payload of the SMS message.

Optionally, in any embodiment, the at least a portion of the first information further includes a hash of at least a portion of a message payload of the SMS message.

Optionally, in any embodiment, the first SMS registry is configured to receive the first information via an encrypted communication channel.

Optionally, in any embodiment, the first SMS registry is configured to receive the first information via an out-of-band communication channel.

Optionally, any embodiment includes a database coupled to the first SMS registry. The database is configured to store network addresses of respective SMS registries in association with respective SMS message sender identifiers. The first SMS registry is configured to extract an SMS message sender identifier from the SMS message and access the database to automatically ascertain a network address of an SMS registry associated with the extracted SMS message sender identifier.

Optionally, in any embodiment that includes a database, each SMS message sender identifier of at least a subset of the SMS message sender identifiers in the database includes a Mobile Network Code (MNC) of a respective home mobile network of a SMS message sender.

Optionally, in any embodiment that includes a database and each SMS message sender identifier of at least a subset of the SMS message sender identifiers in the database includes a Mobile Network Code (MNC), each SMS message sender identifier of at least a subset of the SMS message sender identifiers in the database further includes a Mobile Country Code (MCC) of the respective home mobile network of the SMS message sender.

Optionally, in any embodiment that includes a database, each SMS message sender identifier of at least a subset of the SMS message sender identifiers in the database includes a SMS Sender ID of a respective of the SMS message sender.

Optionally, in any embodiment, the first SMS registry is disposed within the terminating telephone network.

Optionally, in any embodiment, the first SMS registry is disposed outside the terminating telephone network.

Optionally, in any embodiment, the first SMS registry is disposed in the terminating telephone network. The system further includes a second SMS registry disposed outside the terminating telephone network. The second SMS registry is configured to receive the first information about the SMS message. The second SMS registry is configured to send the first information to the first SMS registry. The second SMS registry is configured to receive, from the first SMS registry, the second information about the SMS message. The second SMS registry is configured to automatically compare at least a portion of the first information to a corresponding at least a portion of the second information. As a result of the comparison, in response to detecting a difference between the at least portion of the first information and the corresponding at least portion of the second information, the second SMS registry is configured to automatically send a second signal indicating SMS parameter manipulation.

Optionally, in any embodiment with a second SMS registry, the second SMS registry is coupled to a second SMSC disposed outside the terminating telephone network. The second SMS registry is configured to receive the first information from the second SMSC.

Optionally, in any embodiment with a second SMS registry, the second SMS registry is coupled to an External Short Messaging Entity (ESME) disposed outside the terminating telephone network. The second SMS registry is configured to receive the first information from the ESME.

Optionally, any embodiment with a second SMS registry coupled to an External Short Messaging Entity (ESME) includes a firewall. The firewall is disposed within the terminating telephone network. The firewall is communicably coupled between the ESME and the first SMSC. The firewall is configured to receive the SMS message and selectively transfer the SMS message to the first SMSC in response to absence of the first signal.

Optionally, any embodiment with a second SMS registry also includes a database. The database is coupled to the second SMS registry. The database is configured to store network addresses of respective SMS registries in association with respective SMS message receiver identifiers. The second SMS registry is configured to extract an SMS message receiver identifier from the SMS message and access the database to automatically ascertain a network address of an SMS registry associated with the extracted SMS message receiver identifier.

Another embodiment of the present invention provides a system for detecting SMS parameters manipulation. The system includes an SMS registry. The SMS registry is disposed in a terminating telephone network. The SMS registry is communicably coupled to a Short Message Service Center (SMSC) disposed in the terminating telephone network. The SMS registry is configured to receive first information about an SMS message sent by an External Short Messaging Entity (ESME) disposed outside the terminating telephone network and destined to the SMSC. The first information represents a status of the SMS message before the SMS message enters the terminating telephone network.

The system further includes a firewall. The firewall is disposed in the terminating telephone network. The firewall is communicably coupled between the ESME the SMSC. The firewall is configured to receive the SMS message and send second information about the SMS message to the SMS registry. The second information represents a status of the SMS message after the SMS message enters the terminating telephone network. The SMS registry is configured to automatically compare at least a portion of the first information to a corresponding at least a portion of the second information. As a result of the comparison, in response to detecting a difference between the at least portion of the first information and the corresponding at least portion of the second information, the SMS registry is configured to automatically send an indication of SMS parameter manipulation to the firewall. The firewall is configured to selectively transfer the SMS message to the SMSC in response to absence of the indication of SMS parameter manipulation.

Yet another embodiment of the present invention provides a system for detecting SMS parameters manipulation. The system includes a firewall and an SMS registry. The firewall is disposed in a terminating telephone network and communicably coupled to a Short Message Service Center (SMSC) disposed in the terminating telephone network. The firewall is configured to receive an SMS message sent by an External Short Messaging Entity (ESME) disposed outside the terminating telephone network and destined to the SMSC.

The SMS registry is disposed in the terminating telephone network. The SMS registry is configured to receive first information about the SMS message. The first information represents a status of the SMS message before the SMS message enters the terminating telephone network. The SMS registry is configured to send the first information to the firewall.

The firewall is configured to generate second information about the SMS message. The second information represents a status of the SMS message after the SMS message enters the terminating telephone network. The firewall is configured to automatically compare at least a portion of the first information to a corresponding at least a portion of the second information. As a result of the comparison, in response to detecting no difference between the at least portion of the first information and the corresponding at least portion of the second information, the firewall is configured to automatically transfer the SMS message to the SMSC.

Optionally, in any embodiment with a firewall, the firewall is configured to, as a result of the comparison, in response to detecting a difference between the at least portion of the first information and the corresponding at least portion of the second information, automatically send an indication of SMS parameter manipulation.

An embodiment of the present invention provides a method for detecting SMS parameters manipulation. The method includes communicably coupling a first SMS registry to a first Short Message Service Center (SMSC) disposed in a terminating telephone network. The first SMS registry receives first information about an SMS message destined to the first SMSC. The first information represents a status of the SMS message before the SMS message enters the terminating telephone network. The first SMS registry receives second information about the SMS message. The second information represents a status of the SMS message after the SMS message enters the terminating telephone network.

At least a portion of the first information is automatically compared to a corresponding at least a portion of the second information. As a result of the comparison, in response to detecting a difference between the at least portion of the first information and the corresponding at least portion of the second information, a first signal indicating SMS parameter manipulation is automatically sent.

Optionally, in any method, the at least a portion of the first information includes a sending party telephone number.

Optionally, in any method, the at least a portion of the first information includes an identifier of an External Short Messaging Entity (ESME) that initiated the SMS message.

Optionally, in any method, the at least a portion of the first information includes a telephone number of an intended receiving party of the SMS message.

Optionally, in any method, the at least a portion of the first information includes at least a portion of a message payload of the SMS message.

Optionally, in any method, the at least a portion of the first information further includes a hash of at least a portion of a message payload of the SMS message.

Optionally, in any method, receiving the first information includes receiving, by the first SMS registry, the first information via an encrypted communication channel.

Optionally, in any method, receiving the first information includes receiving, by the first SMS registry, the first information via an out-of-band channel.

Optionally, any method also includes coupling a database to the first SMS registry. The database is configured to store network addresses of respective SMS registries in association with respective SMS message sender identifiers. The first SMS registry extracts an SMS message sender identifier from the SMS message. The first SMS registry accesses the database to automatically ascertain a network address of an SMS registry associated with the extracted SMS message sender identifier.

Optionally, in any method, the first SMS registry is disposed in the terminating telephone network. The method also includes disposing a second SMS registry outside the terminating telephone network. The second SMS registry receives the first information about the SMS message. The second SMS registry sends the first information to the first SMS registry. The second SMS registry receives, from the first SMS registry, the second information about the SMS message.

The second SMS registry automatically compares at least a portion of the first information to a corresponding at least a portion of the second information. As a result of the comparison, in response to detecting a difference between the at least portion of the first information and the corresponding at least portion of the second information, the first SMS registry automatically sends a second signal indicating SMS parameter manipulation.

Another embodiment of the present invention provides a non-transitory computer-readable medium. The medium is encoded with instructions that, when executed by a processor, establish processes for performing a computer-implemented method of detecting SMS parameters manipulation. The processes include a first SMS registry process. The first SMS registry process is configured to be communicably coupled to a first Short Message Service Center (SMSC) disposed in a terminating telephone network. The first SMS registry process receives first information about an SMS message destined to the first SMSC. The first information represents a status of the SMS message before the SMS message enters the terminating telephone network. The first SMS registry process receives second information about the SMS message. The second information represents a status of the SMS message after the SMS message enters the terminating telephone network. The first SMS registry process automatically compares at least a portion of the first information to a corresponding at least a portion of the second information. As a result of the comparison, in response to detecting a difference between the at least portion of the first information and the corresponding at least portion of the second information, the first SMS registry process automatically sends a first signal indicating SMS parameter manipulation.

In accordance with embodiments of the invention, a computer-implemented network verification system includes a first device situated in an originating call network. The first device configured to send call signals to a second device situated in a terminating call network, wherein the second device is coupled to a second registry that stores call signals' data received at the second device as terminating call records. The system also includes a first registry coupled to the first device and configured to, in real-time, obtain, from the first device, call data sent in a call signal and a SIP identity header associated with the call signal, and store as an originating call record in the first registry. The first registry also configured to, in real-time, send, to the second registry over the out-of-band verification network, a first verification request containing the originating call record, and receive a first verification response, wherein the second registry is configured to send the SIP identity header contained in the first verification request to the second device. The first registry further configured to, in real-time, receive, from the second registry over the out-of-band verification network, a second verification request containing a terminating call record that includes a SIP identity header associated with the call signal, and send a second verification response.

In some embodiments, call data contained in a call signal includes a calling A-number, a called B-number, and a call event mark. In some embodiments, the first registry is further configured to obtain, from the first device, number portability information and roaming information associated with the obtained call data. In some embodiments, the first verification request and second verification request include a calling A-number, a called B-number, a call event mark, number portability information, and roaming information associated with a call signal. In some embodiments, the first verification response and second verification response include a calling A-number, a called B-number, a call event mark, number portability information, and roaming information associated with a call signal. In some embodiments, the obtained call data is transmitted from the first device to the first registry by a standard networking protocol, including RADIUS, Diameter, HTTP, or SIGTRAN. In some embodiments, the first registry is further configured to match a called-B number in the originating call record to corresponding E164 ranges so as to identify a host address of the second registry to send the first verification request.

In accordance with embodiments of the invention, a computer-implemented network verification system includes a second device situated in a terminating call network. The second device configured to receive a call signal from a first device situated in an originating network, wherein the first device is coupled to a first registry that stores call signals' data sent from the first device as originating call records. The system also includes a second registry coupled to the second device and configured to, in real-time, obtain, from the second device, call data received in a call signal and a SIP identity header associated with the call signal, and store as a terminating call record in the second registry. The second registry also configured to, in real-time, send, to the first registry over the out-of-band verification network, a second verification request containing the terminating call record, and receive a second verification response. The second registry further configured to, in real-time, receive, from the first registry over the out-of-band verification network, a first verification request that contains an originating call record that includes a SIP identity header associated with the call signal, and send a first verification response. The second registry also configured to, in real-time, send the SIP identity header contained in the first verification request to the second device.

In some embodiments, call data contained in a call signal includes a calling A-number, a called B-number, and a call event mark. In some embodiments, the second registry is further configured to obtain, from the second device, number portability information and roaming information associated with the obtained call data. In some embodiments, the first verification request and second verification request include a calling A-number, a called B-number, a call event mark, number portability information, and roaming information associated with a call signal. In some embodiments, the first verification response and second verification response include a calling A-number, a called B-number, a call event mark, number portability information, and roaming information associated with a call signal. In some embodiments, the obtained call data is transmitted from the second device to the second registry by a standard networking protocol, including RADIUS, Diameter, or HTTP. In some embodiments, the second registry is further configured to match a calling A-number in the terminating call record to corresponding E164 ranges to identify a host address of the first registry to send the second verification request.

In accordance with embodiments of the invention, a computer-implemented method of network verification includes obtaining, from a device situated in a terminating call network, call data received in a call signal and a SIP identity header associated with the call signal, and storing in a registry coupled to the device as a terminating call record. The method further includes sending, to a remote registry over the out-of-band verification network, a second verification request containing the terminating call record, and receiving a second verification response. The method also includes receiving, from the remote registry over the out-of-band verification network, a first verification request that contains an originating call record that includes a SIP identity header associated with the call signal, and sending a first verification response. The method further includes sending the SIP identity header contained in the first verification request to the device.

In some embodiments, call data contained in a call signal includes a calling A-number, a called B-number, and a call event mark. In some embodiments, the method further includes obtaining, from the first device, number portability information and roaming information associated with the obtained call data. In some embodiments, the first verification request and second verification request include a calling A-number, a called B-number, a call event mark, number portability information, and roaming information associated with a call signal. In some embodiments, the first verification response and second verification response include a calling A-number, a called B-number, a call event mark, number portability information, and roaming information associated with a call signal. In some embodiments, the obtained call data and SIP identity header is obtained from the device by a standard networking protocol, including RADIUS, Diameter, HTTP, or SIGTRAN. In some embodiments, the registry is further configured to match a called-B number in the terminating call record to corresponding E164 ranges so as to identify a host address of the remote registry to send the second verification request.

In accordance with embodiments of the invention, a computer system detects abnormalities in a call signal. The computer system includes a first device situated in an originating call network. The first device configured to send call signals to a second device situated in a terminating call network. The second device is coupled to a second registry that stores call signals' data received at the second device as terminating call records. The computer system also includes a first registry coupled to the first device. The first registry is configured to, in real-time, obtain, from the first device, call data sent in a call signal, and store the obtained call data as an originating call record in the first registry. The first registry is also configured to, in real-time, send, to the second registry, a first verification request containing the originating call record, and receive a first verification response, and in response: detect, by processing response data included in the first verification response, a discrepancy between the originating call record and terminating data in the second registry. The first registry is further configured to, in real-time, receive, from the second registry, a second verification request that includes, as request data, a terminating call record stored in the second registry, and in response: detect, by processing the request data: (i) whether an originating call record exists in the first registry that corresponds to the request data, and (ii) a discrepancy between such existing originating call record and the request data, and send, to the second registry, a second verification response based on the processing of the request data.

In some embodiments, call data contained in a call signal includes a calling A-number, a called B-number, and a call event mark. In some embodiments, the call event mark is a call start event. In some of these embodiments, the first registry is further configured to send a spoofing alert to the first device responsive to a discrepancy between a calling A-number in the first verification response and a calling A-number in a corresponding originating call record in the first registry. In some of these embodiments, the first registry is further configured to send a short stopping alert to the first device responsive to the first verification response indicating no call data corresponding to the originating call record exists in the second registry. In some embodiments, the call event mark is a call end event. In some of these embodiments, the first registry is further configured to send a call stretching alert to the first device responsive to a discrepancy between a call end event in the second verification request and a call end event in a corresponding originating call record in the first registry.

In some embodiments, the call event mark is a connect call event. In some of these embodiments, the first registry is further configured to send a false answer supervision alert to the first device responsive to the first verification response indicating no call data corresponding to the originating call record exists in the second registry. In some embodiments, the first registry is further configured to send a PBX hack alert to the first device responsive to PBX hack mark included in the first verification response.

In some embodiments, the first registry is further configured to obtain, from the first device, a Session Initiation Protocol (SIP) identity header, number portability information and roaming information associated with the obtained call data. In some embodiments, the first verification request and second verification request include a calling A-number, a called B-number, a call event mark, a SIP identity header, number portability information, and roaming information associated with a call signal. In some embodiments, the first verification response and second verification response include a calling A-number, a called B-number, a call event mark, number portability information, and roaming information associated with a call signal.

In some embodiments, the obtained call data is transmitted from the first device to the first registry by a standard networking protocol, including RADIUS, Diameter, HTTP, or SIGTRAN. In some embodiments, the first registry is further configured to match a called-B number in the originating call record to corresponding E164 ranges so as to identify a host address of the second registry to send the first verification request. In some embodiments, each of the call signals is a call start signal, a call connect signal, or a call end signal. In some embodiments, the first registry is further configured to include an indication in the second verification response responsive to no originating call record existing in the first registry that corresponds to the request data. In some embodiments, the first verification request, second verification request, first verification response, and second verification response are sent over an out-of-band channel configured between the first registry and second registry.

In accordance with related embodiments of the invention, a computer system detects abnormalities in a call signal. The computer system includes a second device situated in a terminating call network. The second device configured to receive a call signal from a first device situated in an originating network. The first device is coupled to a first registry that stores call signals' data sent from the first device as originating call records. The system also includes a second registry coupled to the second device. The second registry is configured to, in real-time obtain, from the second device, call data received in a call signal, and store the obtained call data as a terminating call record in the second registry. The second registry is also configured to, in real time, send, to the first registry, a second verification request containing the terminating call record, and receive a second verification response, and in response: detect, by processing response data included in the second verification response, a discrepancy between the terminating call record and originating data in the first registry. The second registry is further configured to, in real time, receive, from the first registry, a first verification request that includes, as request data, an originating call record stored in the first registry, and in response: detect, by processing the request data: (i) whether a terminating call record exists in the second registry that corresponds to the request data, and (ii) a discrepancy between such existing terminating call record and the request data, and send a first verification response based on the processing of the request data.

In some embodiments, call data contained in a call signal includes a calling A-number, a called B-number, and a call event mark. In some embodiments, the second registry is further configured to send a spoofing alert to the second device responsive to detection of a discrepancy between a calling A-number in the first verification request and a calling A-number in a corresponding terminating call record in the second registry. In some embodiments, the second registry is further configured to send an interconnect bypass alert to the second device responsive to the calling A-number in the corresponding terminating call record being a local A-number. In some embodiments, the second registry is further configured to send an unconfirmed call alert to the second device responsive to the second verification response indicating no data corresponding to the terminating call record in the first registry.

In some embodiments, the second registry is further configured to obtain, from the second device, a SIP identity header, number portability information and roaming information associated with the obtained call data. In some embodiments, the first verification request and second verification request include a calling A-number, a called B-number, a call event mark, a SIP identity header, number portability information, and roaming information associated with a call signal. In some embodiments, the first verification response and second verification response include a calling A-number, a called B-number, a call event mark, number portability information, and roaming information associated with a call signal. In some embodiments, the second registry is further configured to include an indication in the first verification response responsive to no terminating call record existing in the second registry that corresponds to the request data.

In some embodiments, the second registry is further configured to include a PBX hack mark in the first verification response responsive to: (a) the request data in the first verification request matching a terminating call record in the second registry, (b) a third-party verification request from a third-party matching a called B-number in the terminating call record, and (c) a discrepancy between a calling A-number in the third-party verification request and a calling A-number in the terminating call record. In some embodiments, the second registry is further configured to detect the discrepancy between the calling A-number in the first verification request and the calling A-number in a corresponding terminating call record in the second registry based on a verification response from a third registry coupled to a third device assigned the calling A-number in the terminating call record.

In some embodiments, the obtained call data is transmitted from the second device to the second registry by a standard networking protocol, including RADIUS, Diameter, or HTTP. In some embodiments, the second registry is further configured to match a calling A-number in the terminating call record to corresponding E164 ranges to identify a host address of the first registry to send the second verification request. In some embodiments, each of the call signals is a call start signal, a call connect signal, or a call end signal. In some embodiments, the second registry is further configured to send a SIP identity header received in the first verification request to the second device. In some embodiments, the first verification request, second verification request, first verification response, and second verification response are sent over an out-of-band channel configured between the first registry and second registry.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Embodiments of the present invention are directed to methods and systems for detecting fraudulent activities with respect to voice calls, such as (CLI) spoofing, short stopping, call stretching, interconnect bypass, private branch exchange (PBX) hack, robocalls, Wangiri scams, etc., and alerting call network equipment to such activities in real-time. Some of the embodiments provide a bi-directional handshake exchange performed, over an encrypted out-of-band channel, between the call network that originates a call and the call network that terminates the call. The bi-directional handshake verifies the legitimacy of call signals that are communicated to execute the call. Some embodiments of the present invention are directed to detecting SMS parameters manipulation. Some embodiments provide SMS registries, which compare at least portions of sent and received SMS messages to automatically detect SMS parameter manipulation that occurs between the times the messages are sent and received. In some embodiments, a firewall performs the comparison. The SMS registries communicate with each other over encrypted out-of-band channels.

Figure 1:
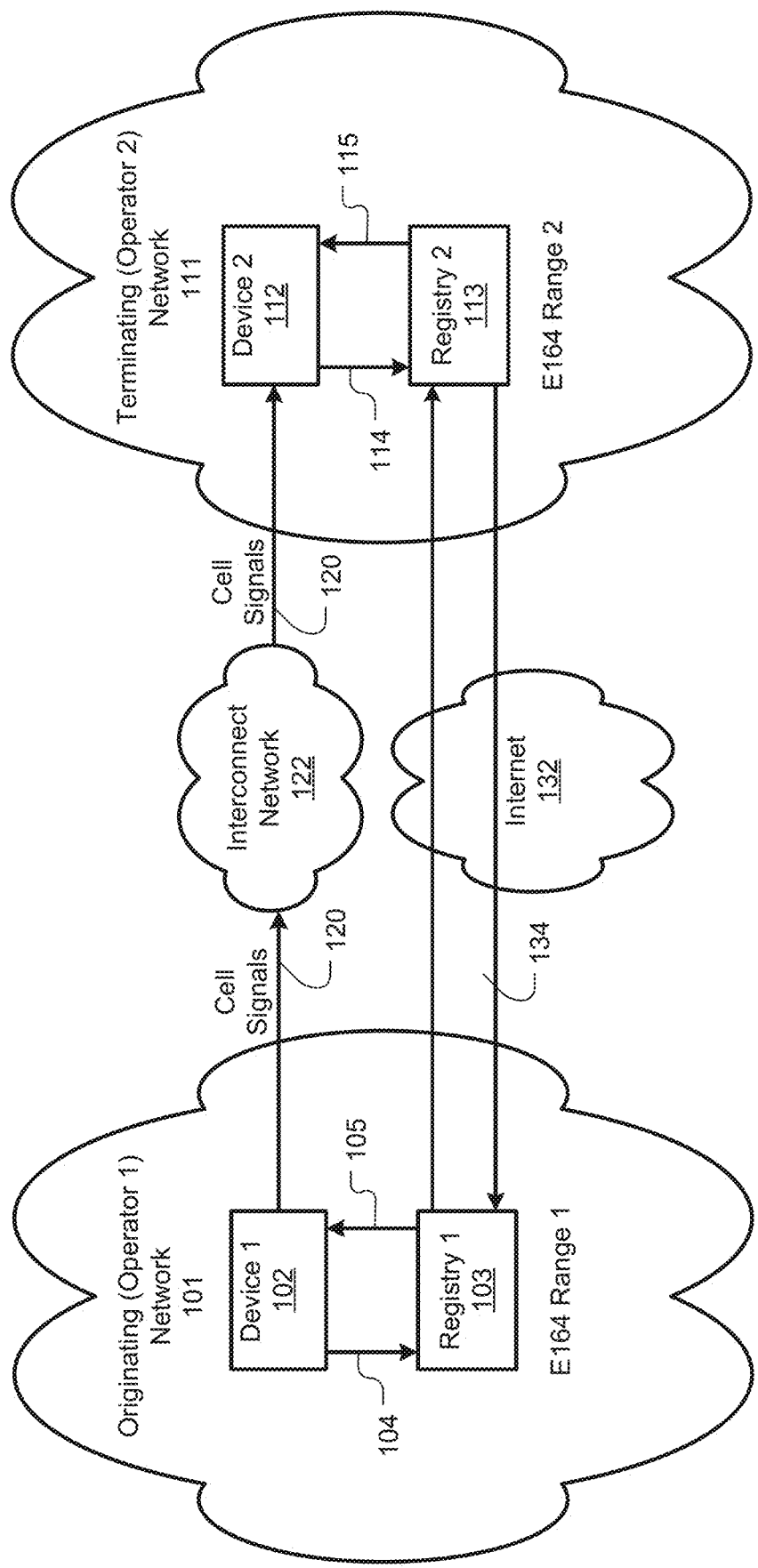
FIG. 1 is a block diagram of a computer system for detecting and blocking call fraud, in accordance with embodiments of the present invention.

FIG. 1 is a block diagram of a computer system for detecting and blocking call fraud, in accordance with embodiments of the present invention. The computer system includes an originating call network 101 associated with a first operator that originates a voice call. The originating call network 101 is in the E164 range 1. A first device (call switching device) 102 is situated in the originating call network 101 and communicatively coupled to a first call registry 103. The first device 102 may be a call session control function (CSCF) device, a session border controller (SBC) device, switch, a Customized Application for Mobile Enhanced Logic Service (CAMEL) gateway device, a Service Control Point (SCP) device, telephone application server (TAS), etc. The first registry 103 may be configured with the components shown in FIG. 2. The first registry 103 is assigned a host address (e.g., IP address) associated with the E164 to identify the first registry 103. The first device 102 is associated with a calling A-number.

The computer system of FIG. 1 also includes a terminating call network 111 associated with a second operator that terminates the call. The terminating call network 111 is in the E164 range 2. A second device (call switching device) 112 is situated in the terminating call network 111 and communicatively coupled to a second call registry 113. The second device 112 may be a call session control function (CSCF) device, a session border controller (SBC) device, switch, a Customized Application for Mobile Enhanced Logic Service (CAMEL) gateway device, a Service Control Point (SCP) device, a telephone application server (TAS), etc. The second registry 113 may be configured with the components shown in FIG. 2. The second registry 113 is assigned a host address (e.g., IP address) associate with the E164 to identify the second registry 113. The second device 112 is associated with a called B-number.

The computer system of FIG. 1 further includes an interconnect networks 122 of transit carriers and the Internet 132. In FIG. 1, the first device 102 of the originating network 101 is configured to send call signals 120 for a call, through the interconnect networks 122, to the second device 112 of the terminating network 111. The call signals 120 may include a call start signal, a call connect signal, and a call end signal.

The first registry 103 is configured to obtain, from the first device 102, call data 104 sent in a call signal 120 and to store the obtained call data 104 as an originating call record in its database. The call data 104 may include the calling A-number, the called B-number, a call event mark (e.g., a call start event, a call connect event, a call end event, etc.), etc. from the call signal. In some embodiments, the first registry 103 is also configured to obtain from the first device 102, and store, number portability information, roaming information, session identifier, SIP identity header, etc. associated with the call signal. In some embodiments, the first device 102 is configured to transmit the call data to the first registry 103 using a standard networking protocol, such as Remote Authentication Dial-In User Service (RADIUS), Diameter, Hypertext Transfer Protocol (HTTP), SIGTRAN, etc.

The second device 112 is configured to receive the call signal 120 transmitted, over the interconnect networks 122, from the first device 102. The second registry 113 is configured to obtain, from the second device 112, the call data 114 received in the call signal and to store the obtained call data 114 as a terminating call record in its database. The call data 114 may include the calling A-number, the called B-number, and a call event mark (e.g., a call start event, a call connect event, a call end event, etc.), etc. from the call signal. In some embodiments, the second registry 113 is also configured to obtain from the second device 112, and store, number portability information, roaming information, session identifier, a SIP identity header, etc. associated with the call signal. In some embodiments, the second device 112 is configured to transmit the call data to the second registry 113 using a standard networking protocol, such as RADIUS, Diameter, HTTP, SIGTRAN, etc.

The call data contained in a call signal 120 may sometimes be changed on its path from the first device 102 in the originating network 101 to the second device 112 in the terminating network 111. In some situations, the change may cause the call signal to be stopped or re-routed through the interconnect network 122, such that the call signal does not reach the second device 112. In other situations, a call signal received at the second device 112 may be configured so that it appears to have been sent from the first device 102, although the call signal was sent by a third-party device. Accordingly, for a call signal, discrepancies may exist between the originating call record stored in the first registry 103 and the terminating call record stored in the second registry 113. Often such situations occur as a result of intentional manipulation of the call signal to perform fraudulent activities with respect to the call, such as caller identifier (CLI) spoofing, short stopping, call stretching, interconnect bypass, private branch exchange (PBX) hack, robocalls, Wangiri, etc.

To detect such call signal manipulation, the first registry 103 and the second registry 113 are configured to perform a bi-directional handshake to exchange their records for a given call signal, over an encrypted out-of-band channel 134 configured between the first registry 103 and second registry 113 through the Internet 132. The encrypted out-of-band channel 134 is distinct from the network path used to transmit the call signals 120 through the interconnect network 122.

As part of the handshake exchange, the first registry 103 is configured to send a first verification request, over the out-of-band channel 134, to the second registry 113. The first verification request contains, as request data, information from the originating call record stored at the first registry 103 for the call signal. The first verification request may include the calling A-number, the called B-number, a call event mark (e.g., a call start event, an intermediate connect event, a call end event, etc.), the SIP identity header, number portability information, and roaming information associated with the call signal. In some embodiments, the first verification request may also include a session identifier of the call signal. The second registry 113 is configured to receive the first verification request and, in response, detect, by processing the request data: (i) whether a terminating call record exists in the second registry 113 that corresponds to the request data, and (ii) any discrepancy between such existing terminating call record and the request data. In some embodiments, the second registry 113 is configured to send the SIP identity header received in the first verification request to the second device 112.

The second registry 113 is configured to send, over the out-of-band channel 134 to the first registry 103, a first verification response based on such processing of the request data. The first verification response may include the calling A-number, the called B-number, a call event mark (e.g., a call start event, an intermediate connect event, a call end event, etc.), number portability information, roaming information associated with the call signal, and an indication of any detected discrepancy between the request data in the first verification request and the second registry records (e.g., no call record, PBX hack, CLI spoof, etc.). The first registry 103 is configured to receive the first verification response, and in response, detect, by processing the response data included in the first verification response, any discrepancy between the terminating call record in the second registry 113 and originating call record in the first registry 103.

Also as part of the handshake exchange, the second registry 113 is configured to send a second verification request, over the out-of-band channel 134, to the first registry 103. The second verification request contains, as request data, information from the terminating call record obtained and stored at the second registry 113 for the received call signal. The second verification request may include the calling A-number, the called B-number, a call event mark (e.g., a call start event, an intermediate connect event, a call end event, etc.), the SIP identity header, number portability information, and roaming information associated with the call signal. In some embodiments, the second verification request may also include a session identifier of the call signal.

The first registry 103 is configured to receive the second verification request and, in response, detect, by processing the request data: (i) whether an originating call record exists in the first registry 103 that corresponds to the request data, and (ii) any discrepancy between such existing originating call record and the request data. The first registry 103 is configured to send, over the out-of-band channel 134 to the second registry 113, a second verification response based on the processing of the request data. The second verification response may include the calling A-number, the called B-number, a call event mark (e.g., a call start event, an intermediate connect event, a call end event, etc.), number portability information, roaming information associated with the call signal, and an indication of any detected discrepancy between the request data in the second verification request and the first registry records (e.g., no call record, CLI spoof, etc.). The second registry 113 is configured to receive the second verification response, and in response, detect, by processing response data included in the second verification response, any discrepancy between the terminating call record in the second registry 113 and originating call record in the first registry 103.

The first registry 103 is configured to generate alerts 105 responsive to the data contained in the first verification response or second verification request indicating a discrepancy in the originating call record stored in the first registry 103. The first registry 103 is configured to send these alerts 105 to the first device 102 for taking actions with respect to the alerts. The second registry 113 is configured to generate alerts 115 responsive to the data contained in the first verification request or second verification response indicating a discrepancy in the terminating call record stored in the second registry 113. The first registry 103 is configured to send these alerts 115 to the first device 102 for taking actions with respect to the alerts. Such alerts are described in further detail in connection with FIGS. 4-11.

Figure 2:
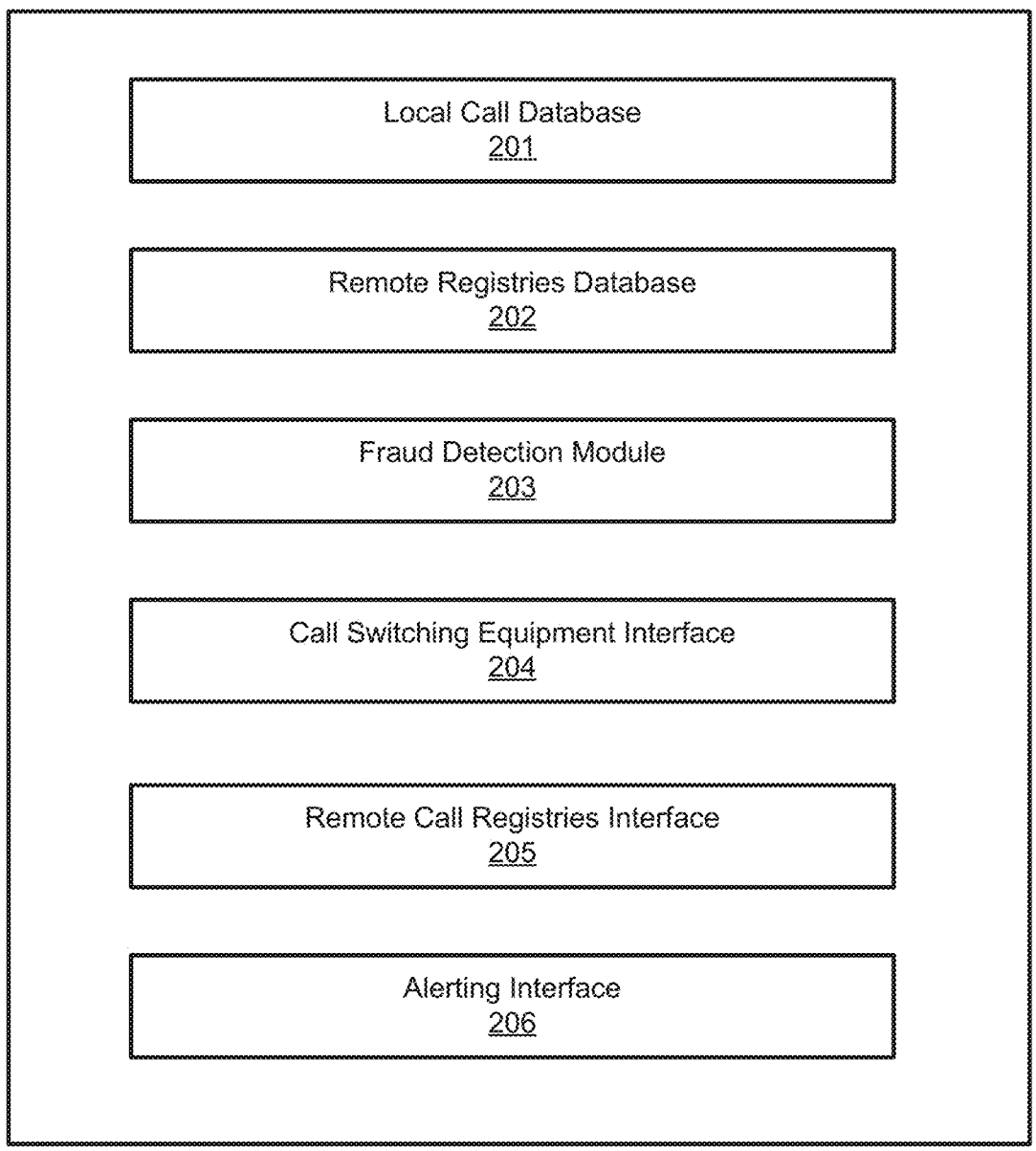
FIG. 2 is a block diagram showing components of a call registry, in accordance with embodiments of the present invention.

FIG. 2 is a block diagram showing components of a call registry, in accordance with embodiments of the present invention. In some embodiments, the first registry 103 of FIG. 1 is configured with these call registry components, and in some embodiments, the second registry 113 of FIG. 1 is configured with these call registry components.

The call registry components of FIG. 2 include a local database 201 to store call records associated with call signal data obtained from a local switching device. For example, the first registry 103 in FIG. 1 may store call signal data 104, obtained from local switching device 102, in its local database 201 as originating call records. The call registry components of FIG. 2 also include a remote registries database 202 to store data associated with remote call registries. For a given remote call registry, this database 202 may contain records including the E164 range associated with the remote call registry, the IP address assigned to the remote call registry, etc. Discovering and storing the IP address of a remote call registry is useful so that this information is available for sending a verification request, when needed, to that remote call registry. For example, for a received call signal, the called B-number in the call signal is attempted to be matched to the E164 ranges in its remote registries database 202. If a match is found, a verification request is sent to the IP address of the originating call registry corresponding to the matched E164 range in the database 202.

The call registry components of FIG. 2 further include a fraud detection module 203 configured with logic (e.g., hardware components, software instructions, etc.) to detect discrepancies, between the call data in the local database 201 and the call data received in verification requests and responses from remote registries, indicative of call fraud and generate associated alerts. Examples of fraud detected by the fraud detection module 203 is described in detail in connection with FIGS. 4-11.

The call registry components of FIG. 2 also include a call switching equipment interface 204 for the call registry to communicate with call switching devices. For example, the first registry 103 of FIG. 1 may use the call switching equipment interface 204 to communicate with the local switching device 102, such as obtaining from the device 102 call data 104 using a standard networking protocol (e.g., RADIUS, Diameter, HTTP, SIGTRAN, etc.).

The call registry components of FIG. 2 further include a remote registries interface 205 for the call registry to communicate with remote registries, such as by sending verification requests and verification responses to the remote registries. For example, the first registry 103 of FIG. 1 may use the remote registries interface 205 to send a first verification request, over the encrypted out-of-band channel 134, to the second registry 113.

The call registry components of FIG. 2 also include an alerting interface 206 for the call registry to send an alert, generated by the fraud detection module 203, to a local switching device or other external device for taking actions with respect to the alert. For example, the first registry 103 of FIG. 1 may use the alert interface 206 to send an alert 105 to the local switching device 102. In some embodiments, the call registry sends, by email, Slack message, etc., the alert to the personnel responsible for system administration. Optionally, the alert may include a control message to the local switching device to end the associated call. A call registry may include one or more processors that implement the call registry components.

Figure 3:
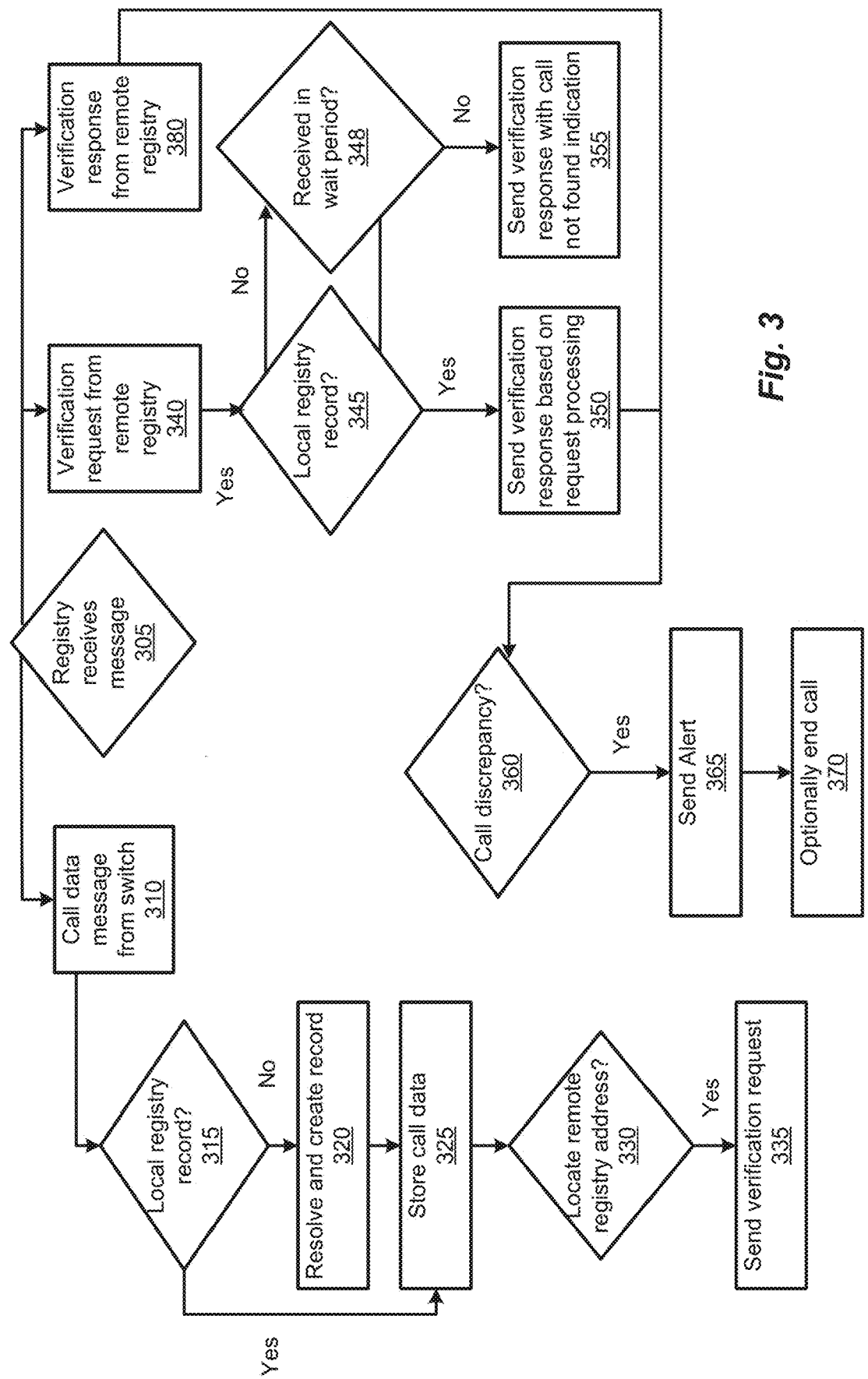
FIG. 3 is a flow chart depicting a method for processing, in real-time, messages received by a call registry, in accordance with embodiments of the present invention.

FIG. 3 is a block diagram depicting a method for processing call messages at a call registry in real-time, in accordance with embodiments of the present invention. The call registry of FIG. 3 is coupled to a local call switching device. The method processes the call messages to detect abnormalities in call signals transmitted as part of a voice call. In some embodiments, the first registry 103 of FIG. 1 uses the method of FIG. 3 to process call messages received from local switching device 102 and the second registry 113. Similarly, in some embodiments, the second registry 113 of FIG. 1 uses the method of FIG. 3 to process call messages received from local switching device 112 and the first registry 103.

The method of FIG. 3 begins at step 305 by the registry (local registry) receiving a message, which is analyzed by the local registry to determine the type of message. If, at step 310, the message is found to be a call signal message received from the local switching device, the method checks 315 the local registry database to determine whether a record exists for the associated call. Note, that in some embodiments, the local switching device transmits the message to the local registry using a standard networking protocol, such as RADIUS, Diameter, HTTP, SIGTRAN, etc. If no such record exists, at step 320, the method resolves the call data and creates a new call record. In some embodiments, to resolve the call data, the method, at step 315, may obtain number portability information, roaming information, session identifier, the SIP identity header, etc. associated with the call signal from the local switching device. The method, at 325, stores the call data of the call signal in the new or existing call record in the local registry database. The call data may include one or more of a calling A-number, a called B-number, a call event mark (e.g., call start event, call connect event, call end event), number portability information, roaming information, session identifier, the SIP identity header, etc.

At step 330, the method locates the registry address for the remote registry coupled to the remote switching device associated with the call signal. For example, if local registry is in the terminating network, then the remote registry is coupled to the switching device, in the originating network, that sent the call signal. In some embodiments, the registry address is a host address (e.g., IP address) that is located by matching the calling A-number and/or the called-B number in the call record to a corresponding E164 ranges. At step 330, the method sends a verification request to the remote registry at the located registry address. The method, at step 330, includes data from the stored call record so that the remote registry can confirm that consistent data for the call signal is stored in the remote registry's database. This data may include one or more of a calling A-number, a called B-number, a call event mark (e.g., call start event, call connect event, call end event), number portability information, roaming information, session identifier, the SIP identity header, etc.

If, at step 340, the message is instead found to be a verification request received from a remote registry, the method checks 345 the local registry database to determine whether a call record exists that corresponds to the data contained in the verification request. This data may include one or more of a calling A-number, a called B-number, a call event mark (e.g., call start event, call connect event, call end event), number portability information, roaming information, session identifier, the SIP identity header, etc. If no such call record exists, the method, at step 348, the method waits a predetermined period of time for corresponding call data to be received from the switch (step 310) and stored as a call record. The method may set a timer to indicate the expiration of the wait period. If the call data is not received during the wait period, at step 355, the method sends a verification response, to the remote registry, with a call not found indication. If a record does exist or call data is receiving during the wait period, at step 350, the method sends a verification response based on the request processing.

If a record does exist or call data is receiving during the wait period, at step 360, the method also checks whether a discrepancy exists between the call record and the data contained in the verification request. For example, a discrepancy between the calling A-number in the call record and the calling A-number contained in the verification request. If such discrepancy exists, at step 365, the method sends an alert to the local switching device for taking actions with respect to the alert. Optionally, at step 370, as part of the alert, the method may send a control message to the local switching device to end the call associated with the verification request. In some embodiments, the SIP identity header contained in the verification request is sent to the local switching device.

If, at step 380, the message received at the local registry is instead found to be a verification response received from a remote registry, at step 360, the method checks whether the verification response indicates a call discrepancy. For example, the verification response may indicate that no call record exists in the remote registry corresponding to a verification request sent by the local registry. If such a discrepancy is indicated, at step 365, the method sends an alert to the local switching device for taking actions with respect to the alert. Optionally, at step 370, as part of the alert, the method may send a control message to the local switching device to end the call associated with the verification response.

Figure 4A:
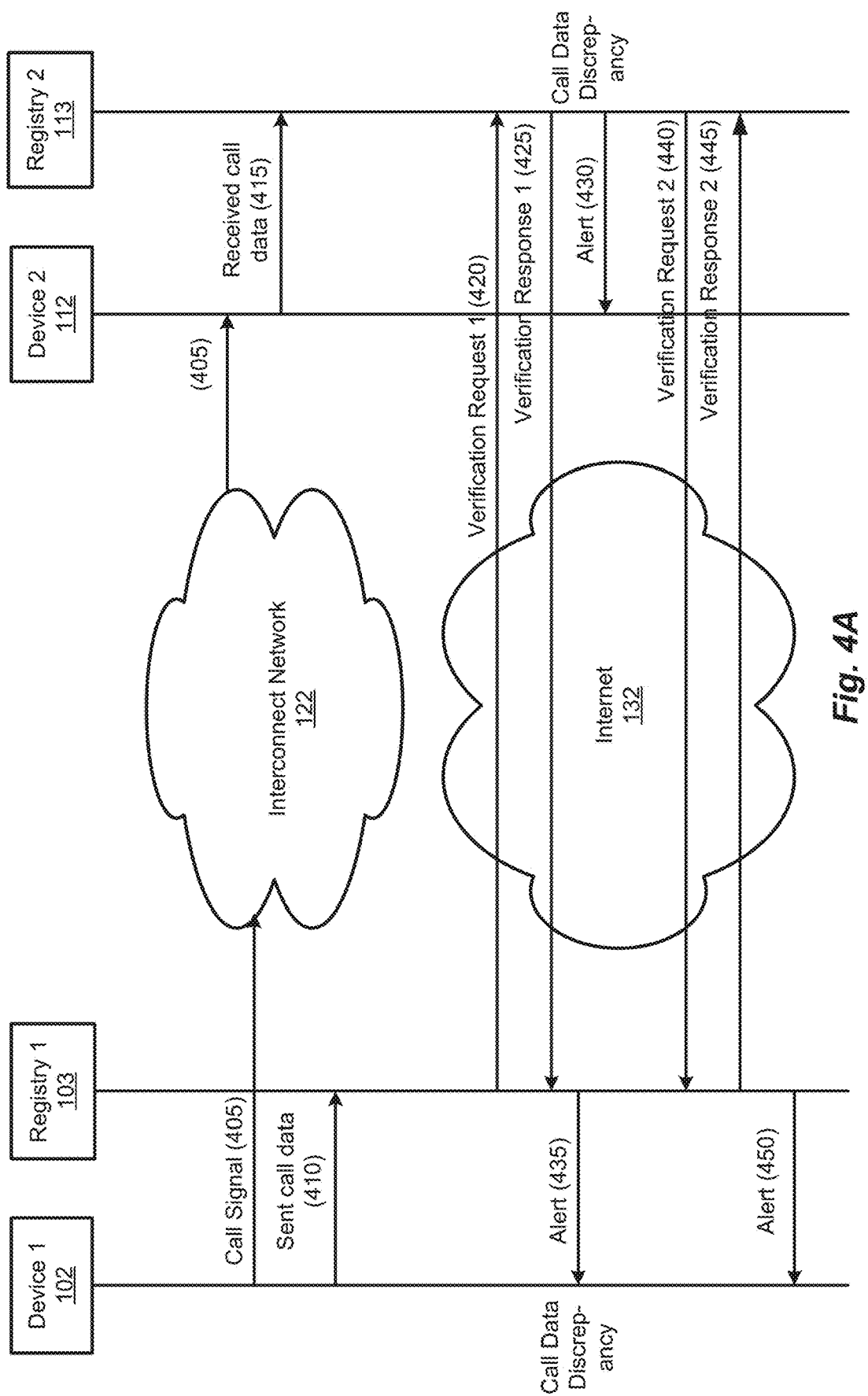
FIG. 4A is a sequence diagram depicting logic flow for generating alerts based on the detection of discrepancies between originating call data and terminating call data associated with a call signal, in accordance with embodiments of the present invention.

FIG. 4A is a sequence diagram depicting logic flow for generating alerts based on the detection of discrepancies between originating call data and terminating call data associated with a call signal, in accordance with embodiments of the present invention.

The sequence diagram depicts example logic flow within the computer system of FIG. 1.

The logic flow begins by the first switching device 102 in the originating network sending a call signal 405, over the interconnect network 122, to the second switching device 112 in the terminating network. In the embodiment of FIG. 4A, the data in the call signal 405 is manipulated prior to reaching the second switching device 112. For example, the call signal 405 may be spoofed by changing the calling A-number contained in the call signal. The first device 102 sends call data 410 contained in the sent call signal to the first registry 103, which stores the call data 410 as an originating call record in its local database. The second device 112 sends call data 415 contained in the received call signal to the second registry 113, which stores the call data 415 as a terminating call record in its local database. Due to the manipulation of the call signal 405, a discrepancy exists between the originating call record in the first registry's database and the terminating call record in the second registry's database.

The first registry 103 sends, over the out-of-band channel 134, a first verification request 420 to the second registry 113. The first verification request 420 includes data from the originating call record stored in the first registry's local database. This data may include one or more of a calling A-number, a called B-number, a call event mark (e.g., call start event, call connect event, call end event), number portability information, roaming information, session identifier, the SIP identity header, etc.

The second registry 113 receives the first verification request 420 from the first registry 103, and determines that a discrepancy exists between the data in the first verification request 420 and the originating call record stored in the second registry's database. The second registry 113 sends, over the out-of-band channel 134, a first verification response 425 with an indication of the discrepancy to the first registry 103. The second registry 113 also sends an alert 430 to the second device 112 for taking actions with respect to the alert. If the discrepancy is between an A-calling number in the first verification request and an A-calling number in the corresponding terminating call record in the second registry's database, the alert 430 sent to the second device 112 is a spoofing alert. If the terminating call record has a local A-number, the alert 430 sent to the second device 112 is a interconnect bypass alert.

In some scenarios, the first verification request 420 arrives from the first registry 103 prior to the call data 415 arriving from the second device 112. In these scenarios, the second registry 113 may wait a predetermined period of time for the arrival of the call data 415 before responding to the first verification request 420. A timer may be used to indicate the expiration of the predetermined period of time.

Responsive to receipt of the first verification response 425 indicating the discrepancy, the first registry 103 sends an alert 435 to the first device 102 for taking actions with respect to the alert. If the discrepancy is between the calling A-number in the terminating call record and the calling A-number in the corresponding originating call record, the alerts 430 and 435 sent to the devices are spoofing alerts. In some embodiments, the second registry 113 is configured to send the SIP identity header received in the first verification request to the second device 112.

The second registry 113 sends, over the out-of-band channel 134, a second verification request 440 to the first registry 103. The second verification 440 request includes data from the terminating call record stored in the second registry's local database. This data may include one or more of a calling A-number, a called B-number, a call event mark (e.g., call start event, call connect event, call end event), number portability information, roaming information, session identifier, the SIP identity header, etc. The first registry 103 receives the second verification request 440 from the second registry 113 and determines that a discrepancy exists between the data in the second verification request and the terminating call record stored in the first registry's database.

The first registry 103 sends, over the out-of-band channel 134, a second verification response 445 with an indication of the discrepancy to the second registry 113. The first registry 103 also sends an alert 450 to the first device 102 for taking actions with respect to the alert. In some embodiments, if the discrepancy is between a call end event in the second verification request and a call end event in the originating call record in the first registry's database, the alert 450 sent to the first device 102 is a call stretching alert. In some embodiments, if the call signal 405 is associated with a call start event, and the discrepancy is between an A-calling number in the second verification request and an A-calling number in the originating call record in the first registry's database, the alert 450 sent to the first device 102 is a spoofing alert.

Note, some embodiments the communication sequence may vary from the sequence depicted in FIG. 4A. For example, the second registry 113 may send the second verification request 440 before sending the first verification response 425. For another example, the second registry 113 may send the alert 430 before sending the first verification response 425.

Also note, in some cases, the local registry may generate some alerts based on the verification request received from a remote registry for a call signal, or the verification response received from the remote registry for that call signals. In some embodiments, for these cases, the local registry generates these alerts based on whichever of these messages is received first from the remote registry.

Figure 4B:
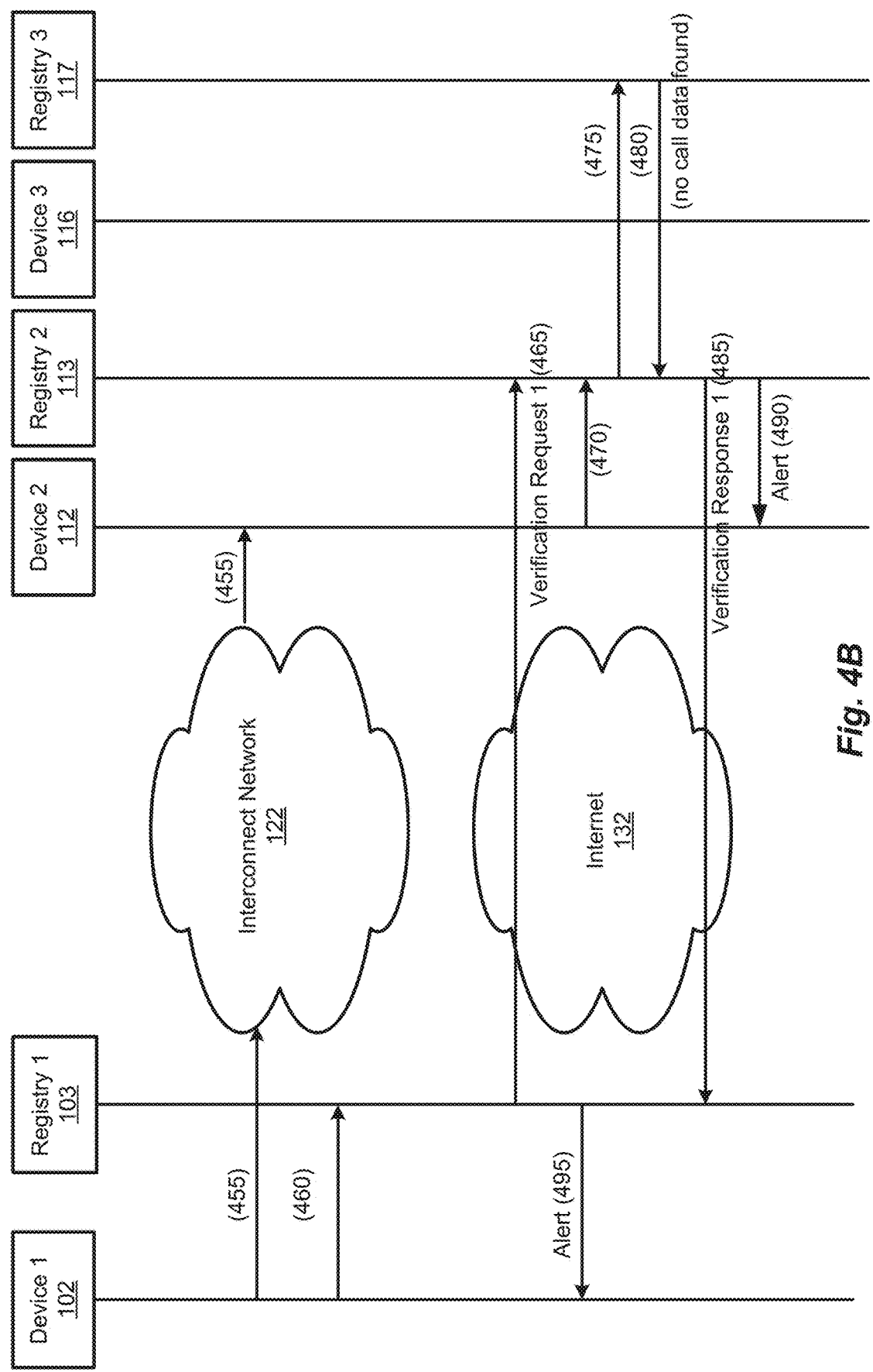
FIG. 4B is a sequence diagram depicting logic flow for generating alerts based on the detection of discrepancies between originating call data, terminating call data, and third-party data associated with a call signal, in accordance with embodiments of the present invention.

FIG. 4B is a sequence diagram depicting logic flow for generating alerts based on the detection of discrepancies between originating call data, terminating call data, and third-party data associated with a call signal, in accordance with embodiments of the present invention.

The logic flow begins by the first switching device 102 in the originating network sending a call signal 455, over the interconnect network 122, to the second switching device 112 in the terminating network. In the embodiment of FIG. 4B, the data in the call signal 455 is manipulated prior to reaching the second switching device 112. In particular, the call signal 455 is spoofed by changing the calling A-number contained in the call signal to the calling A-number of the third device 116. The first device 102 sends call data 460 contained in the sent call signal to the first registry 103, which stores the call data 460 as an originating call record in its local database.

The first registry 103 sends, over the out-of-band channel 134, a first verification request 465 to the second registry 113. The first verification request 465 includes data from the originating call record stored in the first registry's local database. This data may include one or more of a calling A-number, a called B-number, a call event mark (e.g., call start event, call connect event, call end event), number portability information, roaming information, session identifier, the SIP identity header, etc. The second device 112 also sends call data 470 contained in the sent call signal to the second registry 113, which stores the call data 470 as an originating call record in its local database.

Due to the manipulation of the call signal 455, the second registry 113 sends a verification request 475 to the third registry 117 communicatively coupled to the third device 116. As the third device 116 did not actually originating the call signal 455, the third registry 117 does not have a call record corresponding to the call signal 455, and sends a verification response 480 to the second registry 113 indicating no call data found in the third registry 117. Based on the verification response 480, the second registry 113 detects that the calling A-number in the call signal 455 was spoofed and sends a first verification response 485 to the first registry 103 with a call spoof mark. The second registry 113 also sends a call spoofing alert 490 to the second device 112 for taking actions with respect to the alert. Responsive to receipt of the first verification response 485, the first registry 103 similarly sends a call spoofing alert 495 to the first device 102 for taking action with respect to the alert.

Figure 5:
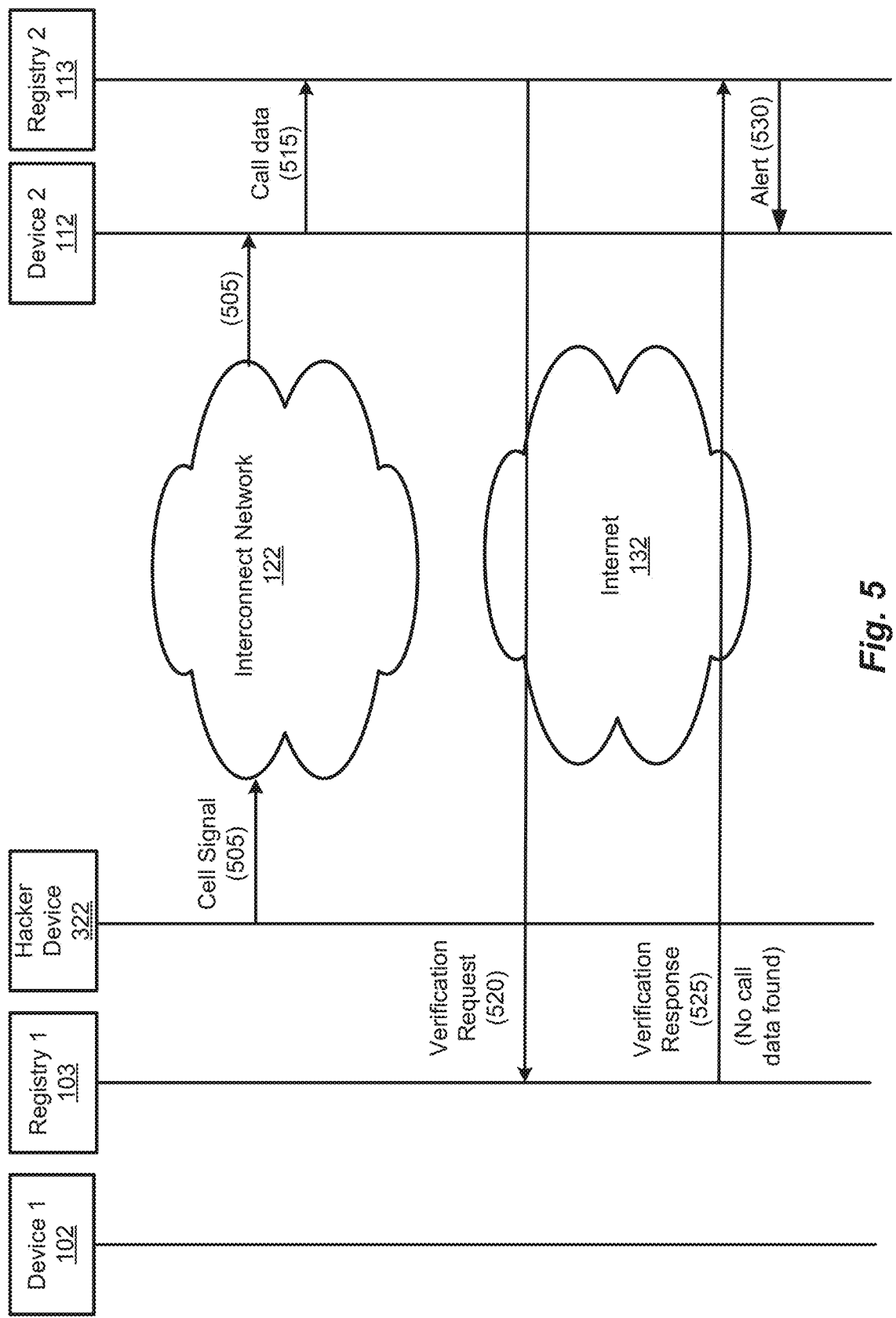
FIG. 5 is a sequence diagram depicting logic flow for generating alerts based on the detection of no originating call record being associated with a call signal, in accordance with embodiments of the present invention.

FIG. 5 is a sequence diagram depicting logic flow for generating alerts based on the detection of no originating call record associated with a call signal, in accordance with embodiments of the present invention. The sequence diagram depicts example logic flow within the computer system of FIG. 1.

The logic flow begins by a third-party hacker device 322 sending a call signal 505, over the interconnect network 122, to the second switching device 112 in the terminating network. The hacker device 322 configures the call signal 505 such that the call signal 505 appears to have originated from the first switching device 102 in the originating network. The second device 112 sends the call data 515 contained in the received call signal 505 to the second registry 113, which stores the call data as a terminating call record in its local database.

The second registry 113 sends, over the out-of-band channel 134, a verification request 520 to the first registry 103. The verification request 520 includes data from the terminating call record stored in the second registry's local database. This data may include one or more of a calling A-number, a called B-number, a call event mark (e.g., call start event, call connect event, call end event), number portability information, roaming information, session identifier, the SIP identity header, etc. The first registry 103 receives the verification request 520 from the second registry 113 and determines that a no originating call record exists in its local database that corresponds to the data contained in the verification request 520. In response, the first registry 103 sends, over the out-of-band channel 134, a verification response 525 with an indication of no originating call data found in the first registry 103.

Figure 6:
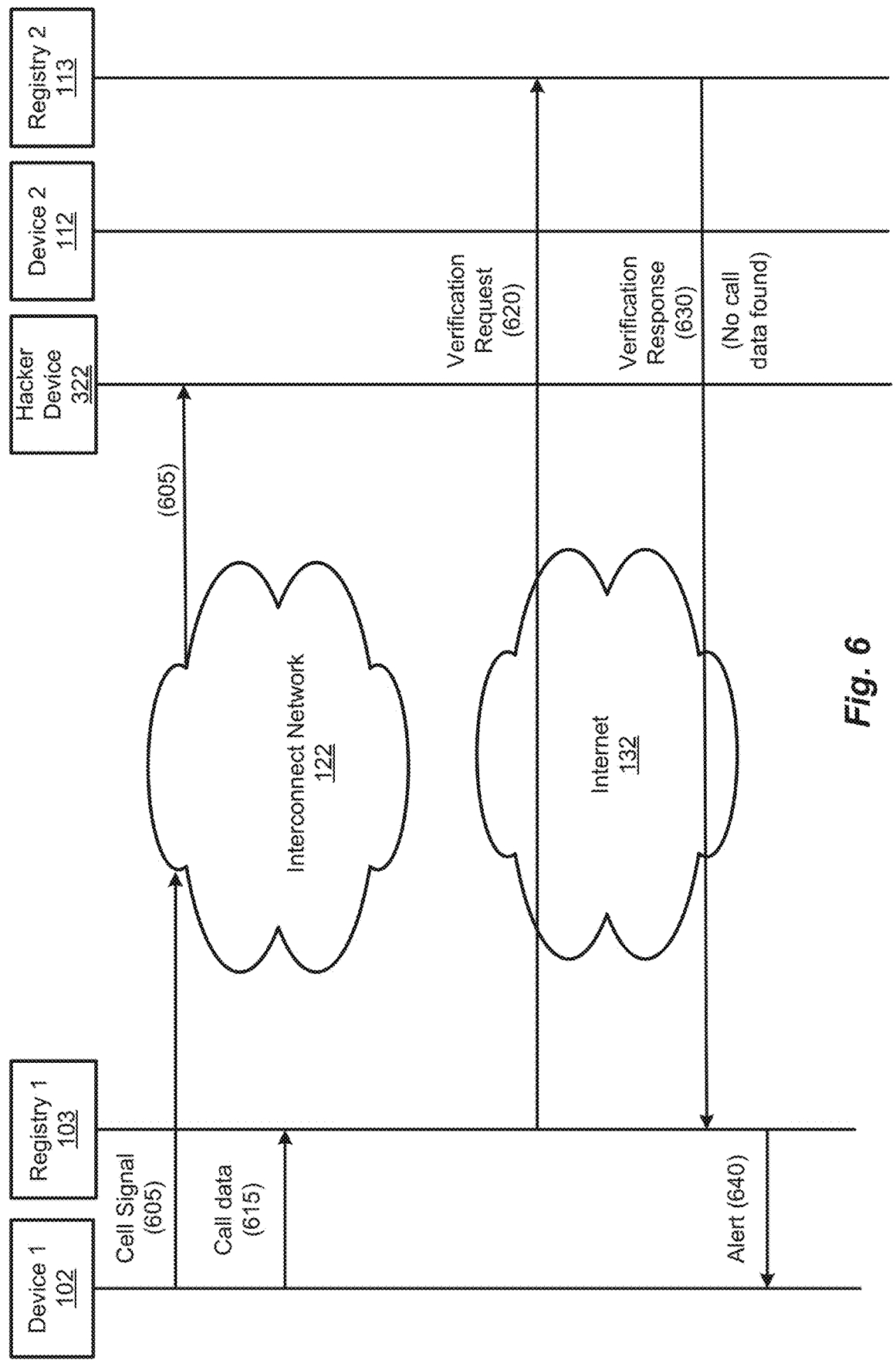
FIG. 6 is a sequence diagram depicting logic flow for generating alerts based on the detection of no terminating call record being associated with a call signal, in accordance with embodiments of the present invention.

Responsive to receipt of the verification response 525 indicating no originating call data found, the second registry 113 sends an alert 530 to the second device 112 for taking actions with respect to the situation of the call signal not actually originating from the first device 102. In some embodiments, the alert 530 is an unconfirmed call alert indicating a robocall, Wangiri scam, etc FIG. 6 is a sequence diagram depicting logic flow for generating alerts based on the detection of no terminating call record associated with a call signal, in accordance with embodiments of the present invention. The sequence diagram depicts example logic flow within the computer system of FIG. 1.

The logic flow begins by the first switching device 102 in the originating network sending a call signal 605, over the interconnect network 122, to the second switching device 112 in the terminating network. A hacker device 322 intercepts the call signal 605, such that the call signal 605 never reaches the second switching device 112. For example, the hacker device 322 may re-route the call signal 605 to a switching device in another call network. The first device 102 sends the call data 615 contained in the sent call signal 605 to the first registry 103, which stores the call data as an originating call record in its local database. As the call signal 605 never reached the second device 112, no terminating call record is stored in the second registry 113 for the call signal 605.

The first registry 103 sends, over the out-of-band channel 134, a verification request 620 to the second registry 113. The verification request 620 includes data from the terminating call record stored in the first registry's local database. This data may include one or more of a calling A-number, a called B-number, a call event mark (e.g., call start event, call connect event, call end event), number portability information, roaming information, session identifier, the SIP identity header, etc. The second registry 113 receives the verification request 620 from the second registry 113 and determines that a no terminating call record exists in its local database that corresponds to the data contained in the verification request 620. In response, the second registry 113 sends, over the out-of-band channel 134, a verification response 630 with an indication of no terminating call data found in the second registry 113. In some embodiments, the second registry 113 may wait a predetermined period of time for corresponding data to arrive from the second device 112 prior to sending the verification response 630.

Responsive to receipt of the verification response 630 indicating no terminating call data found, the first registry 103 sends an alert 640 to the first device 102 for taking actions with respect to the situation of the call signal not reaching the second device 112. In some embodiments, if the call signal 605 is associated with a call start event, the alert 640 is a short stopping alert. In some embodiments, if the call signal 605 is associated with call connect event, the alert 640 is a false answer supervision alert.

Figure 7:
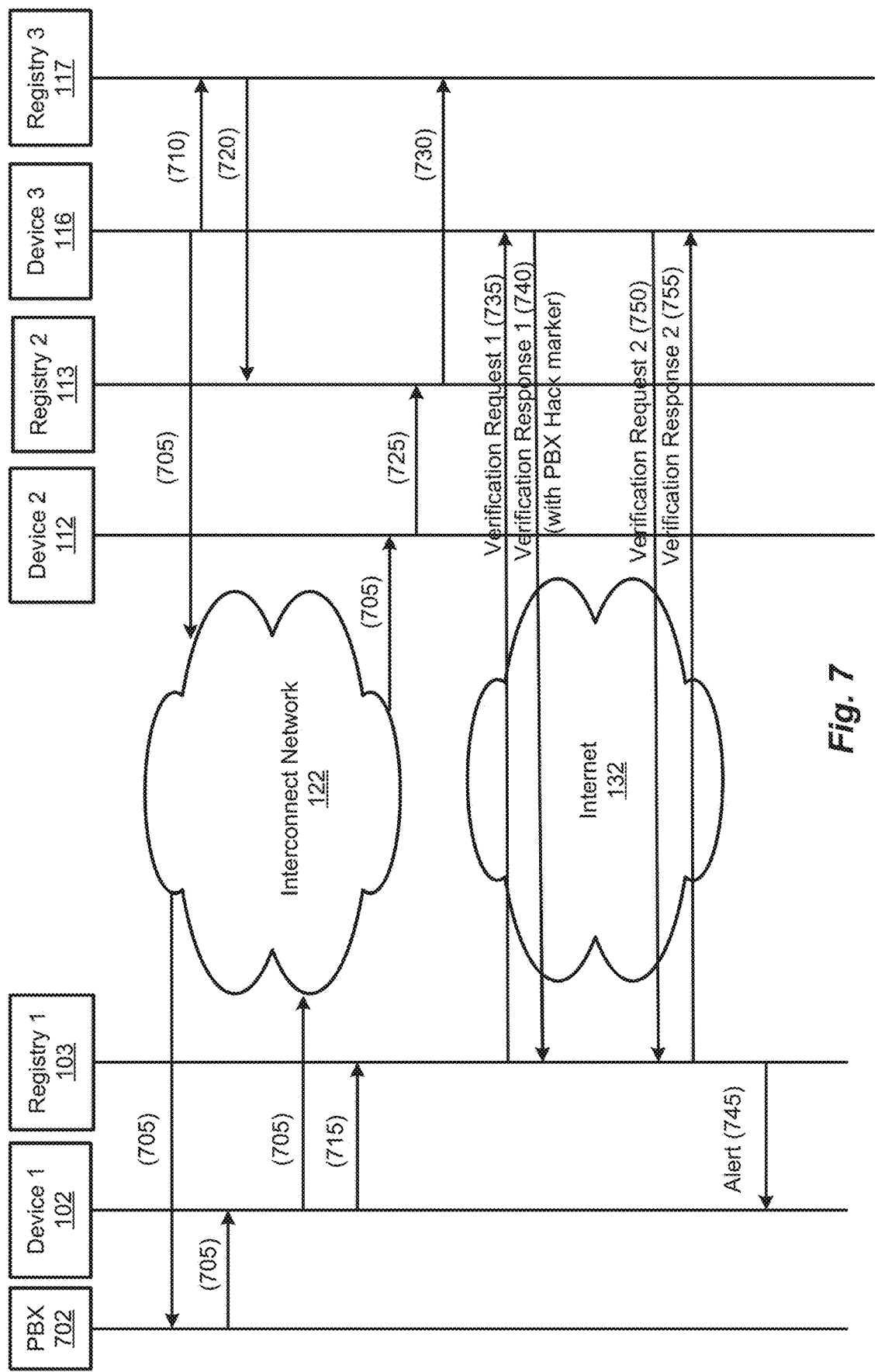
FIG. 7 is a sequence diagram depicting logic flow for generating alerts based on the detection of a PBX hack, in accordance with embodiments of the present invention.

FIG. 7 is a sequence diagram depicting logic flow for generating alerts based on the detection of a PBX hack, in accordance with embodiments of the present invention. The sequence diagram depicts example logic flow within the computer system of FIG. 1.

In the logic flow, a third switching device 116, in the call network of a third operator, initiates a legitimate call destined to the second switching device 112. To do so, the third switching device sends, over the interconnect network 122, a call signal 705 with the calling A-number of the third switching device 116 and called B-number of the second switching device 112. A carrier in the interconnect network 122 redirects the call signal 705 in to the PBX 702 in the call network of the first switching device 102, and thus changes the calling A-number in the call signal 705 to the call A-number assigned to the first device 102. Based on the changed call data in the call signal 705, the PBX 702 sends the call signal 705 to the first device 102, which in turn sends the call signal to the second device 112.

In response to sending the call signal 705, the third device 116 sends the call data 710 contained in the sent call signal 705 to the third registry 117, which stores the call data 710 as an originating call record in its local database. In response to receiving the call signal 705, the first device 102 sends the call data 715 contained in the received call signal 705 to the first registry 103, which stores the call data as an originating call record in its local database. The third registry 117 then sends a third-party verification request 720 of the call data 710 to the second registry 113, and the second device 112 also sends the call data 725 received from the first device 102 to the second registry 113, which stores the call data as an originating call record in its local database. Based on the discrepancy in the calling A-numbers in the verification request from the third registry 117 and the originating call record of the call signal 705 from the first device 102, the second registry 113 sends a verification response to the third registry 117 indicating call spoofing of the call signal 705.

The first registry 103 sends a first verification request 735 to the second registry 113. The first verification request 735 includes data from the originating call record stored in the first registry's local database. The second registry 113 receives the first verification request 735 from the first registry 103 and determines that the terminating call record matches the data in the first verification request 735. The second registry 113 also determines that the data in the third-party verification request 720 from the third registry 117 matched the called B-number in the terminating call record, but a discrepancy existed between the calling A-number in the third-party verification request 720 and the calling A-number in the terminating call record. Based on these determinations, the second registry 113 detects a PBX hack occurred with respect to the call signal 705

The second registry 113 sends a first verification response 740 with a PBX hack mark indicative of the detected PBX hack of the call signal 705. Responsive to receipt of the first verification response 740, the first registry 103 sends a PBX hack alert 745 to the first device 102 for taking actions with respect to the alert.

The second registry 113 also sends a second verification request 750 to the first registry 103 containing data from the terminating call record in the second registry's database. The first registry 103 receives the second verification request 440 from the second registry 113 and determines that a discrepancy (in the calling A-number) exists between the data in the second verification request 750 and the originating call record stored in the first registry's database. The first registry 103 sends a second verification response 745 with an indication of the discrepancy to the second registry 113. In some embodiments, the second registry 113 may also generate an alert based on the discrepancy.

Figure 8:
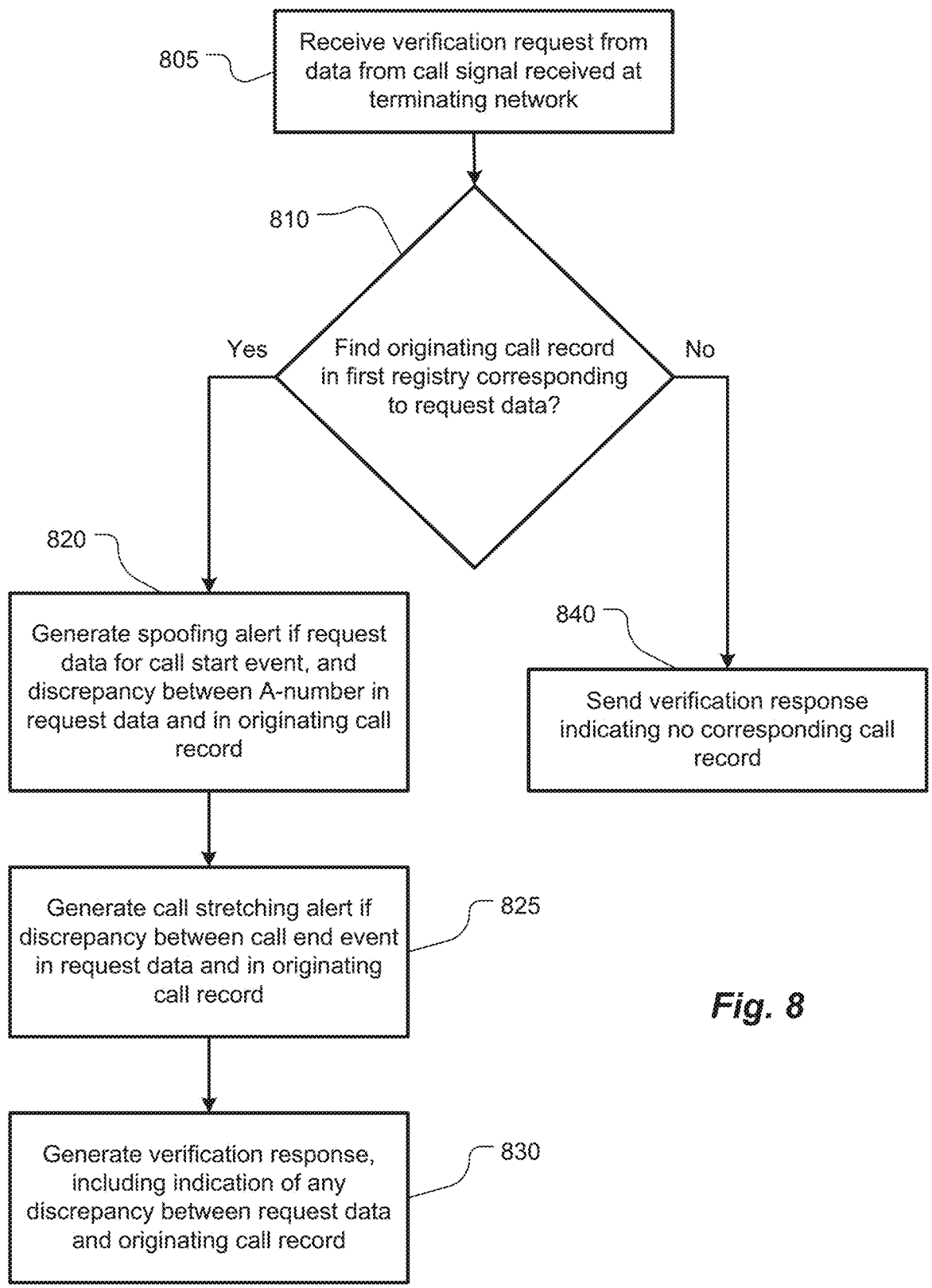
FIG. 8 is a flow chart depicting a method for processing verification requests by a call registry in an originating call network, in accordance with embodiments of the present invention.

FIG. 8 is a flow chart depicting a method for processing verification requests by a call registry in an originating call network, in accordance with embodiments of the present invention. The call registry (local registry) is communicatively coupled to a call switching device in the originating call network. In some embodiments, the method of FIG. 8 is performed by the first call registry 103 of FIG. 1.

The method begins at step 805 by the local registry receiving, from a remote registry in a terminating call network, a verification request to verify a call signal received at a call switching device in the terminating call network. The verification request contains, as request data, the call data in the call signal received at the terminating call network. The method, at step 810, checks the local registry's database to find an originating call record that corresponds to the request data in the verification request. If no such call record is found, at step 840, the local registry sends, to the remote registry, a verification response indicating no corresponding call record in the local registry's database.

If an originating call record is found, at step 820, the method checks if the request data is for a call start event. If so, the method further checks if a discrepancy exists between the calling A-number in the request data and the calling A-number in the originating call record. If such discrepancy exists, the method generates a spoofing alert that is transmitted to the communicatively coupled switching device to take action with respect to the alert, such as ending the associated call.

At step 825, the method checks if the request data is for a call end event. If so, the method checks if a discrepancy exists between the call end event in the request data and the call end event in the originating call record. If such discrepancy is present, the method generates a call stretching alert that is transmitted to the communicatively coupled switching device to take action with respect to alert, such as ending the associated call. At step 830, the method generates a verification response, which includes an indication of any discrepancy between the request data and originating call record, such as a discrepancy in the calling A-number, in the call end event, etc.

Figure 9:
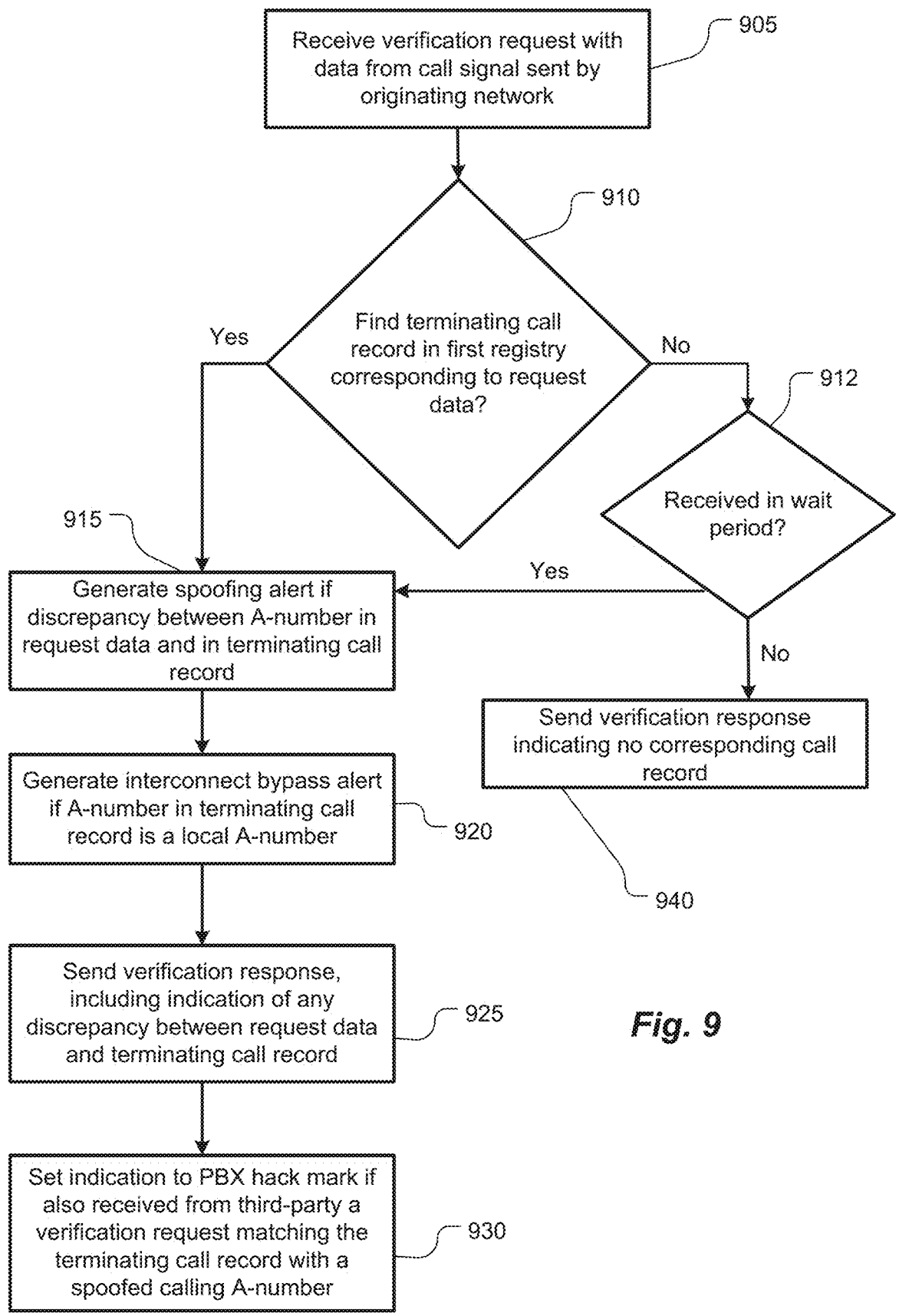
FIG. 9 is a flow chart depicting a method for processing verification requests by a call registry in a terminating call network, in accordance with embodiments of the present invention.

FIG. 9 is a flow chart depicting a method for processing verification requests by a call registry in a terminating call network, in accordance with embodiments of the present invention. The call registry (local call registry) is communicatively coupled to a call switching device in the terminating call network. In some embodiments, the method of FIG. 9 is performed by the first call registry 103 of FIG. 1.

The method begins at step 905 by the local registry receiving, from a remote registry in a terminating call network, a verification request to verify a call signal sent from a call switching device in the originating network. The verification request contains, as request data, the call data in the call signal sent by the originating call network. The method, at step 910, checks the registry's database to find a terminating call record that corresponds to the request data in the verification request. If no such call record is found, at step 912, the method waits a predetermined period of time for corresponding call data (from a call signal) to be received from the switching device and stored in a terminating call record. The method may set a timer to indicate the expiration of the wait period. If the call data is not received during the wait period, at step 940, the local registry sends, to the remote registry, a verification response indicating no corresponding call record in the local registry's database.

If a terminating call record is found or call data is received during the wait period, at step 915, the method checks if a discrepancy exists between the calling A-number in the request data and the calling A-number in the terminating call record. If such discrepancy exists, the method generates a spoofing alert that is transmitted to the communicatively coupled switching device to take action with respect to the alert. At step 920, the method further checks if the A-number in the terminating call record is a local A-number. If so, the method generates an interconnect bypass alert that is transmitted to the communicatively coupled switching device to take action with respect to the alert.

At step 925, the method generates a verification response, which includes an indication of any discrepancy between the request data and terminating call record, such as a discrepancy in the calling A-number, etc. At step 930, the method checks the local registry's database to determine if a third-party also sent a verification request containing request data matching to the terminating call record, but with a spoofed calling A-number. If so, the method sets the indication in the verification response to include a PBX hack mark.

Figure 10:
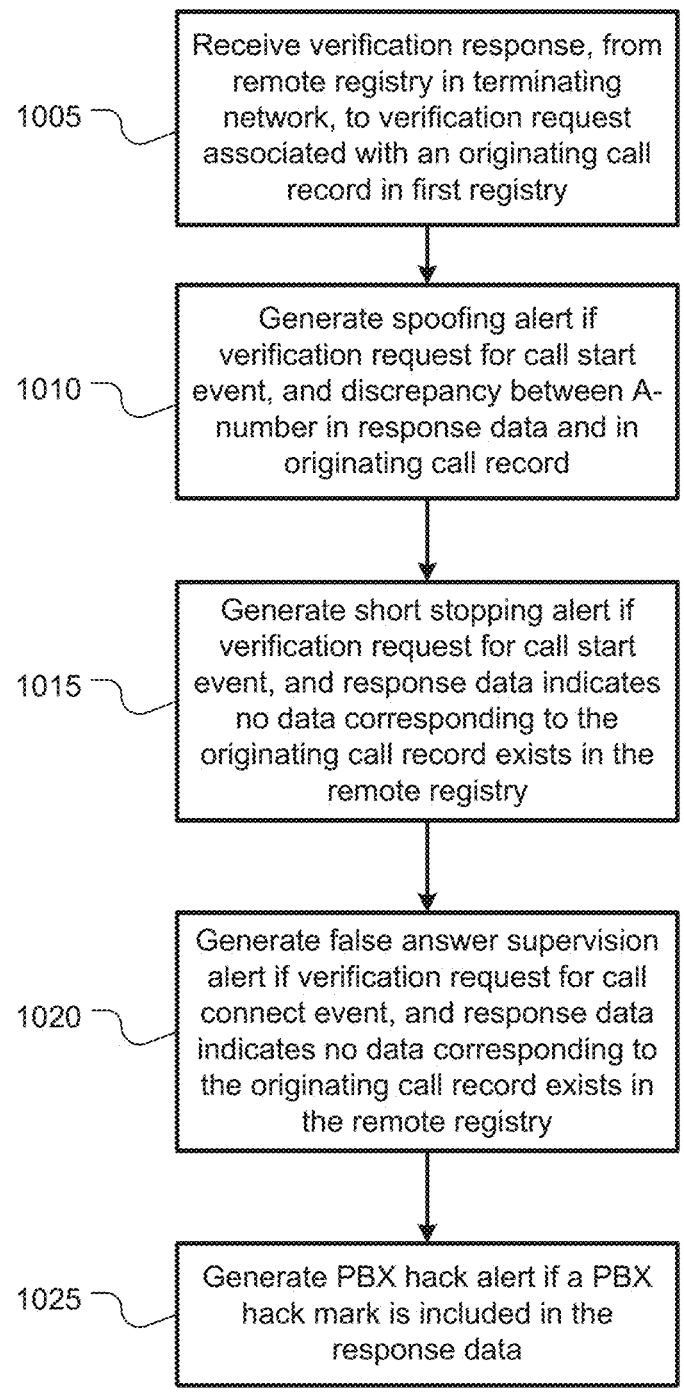
FIG. 10 is a flow chart depicting a method for processing verification responses by a call registry in an originating call network, in accordance with embodiments of the present invention.

FIG. 10 is a flow chart depicting a method for processing verification responses by a call registry in an originating call network, in accordance with embodiments of the present invention. The call registry (local registry) is communicatively coupled to a call switching device in the originating call network. In some embodiments, the method of FIG. 8 is performed by the first call registry 103 of FIG. 1.

The method begins at step 1005 by the local registry receiving, from a remote registry in a terminating call network, a verification response. The receipt of the verification response is based on a verification request sent by the local registry to verify a call signal sent by the communicatively coupled call switching device to the terminating network. The call data of this call signal is stored in the local registry as an originating call record. The verification response contains, as response data, the call data in the call signal received at the terminating call network.

At step 1010, the method checks if the response data is for a call start event. If so, the method further checks if a discrepancy exists between the calling A-number in the response data and the calling A-number in the originating call record. If such discrepancy exists, the method generates a spoofing alert that is transmitted to the communicatively coupled switching device to take action with respect to the call spoofing. At step 1015, the method checks if the response data is for a call start event. If so, the method further checks the response data for an indication of no data corresponding to the originating call record exists in the remote registry. If such indication exists, the method generates a short stopping alert that is transmitted to the communicatively coupled switching device to take action with respect to the short stopping.

At step 1020, the method checks if the response data is for a call connect event. If so, the method further checks the response data for an indication of no data corresponding to the originating call record exists in the remote registry. If such indication is present, the method generates a false answer supervision alert that is transmitted to the communicatively coupled switching device to take action with respect to this alert. At step 1025, the method checks if a PBX hack mark is included in the response data. If such indication is present, the method generates a PBX hack alert that is transmitted to the communicatively coupled switching device to take action with respect to this alert.

Figure 11:
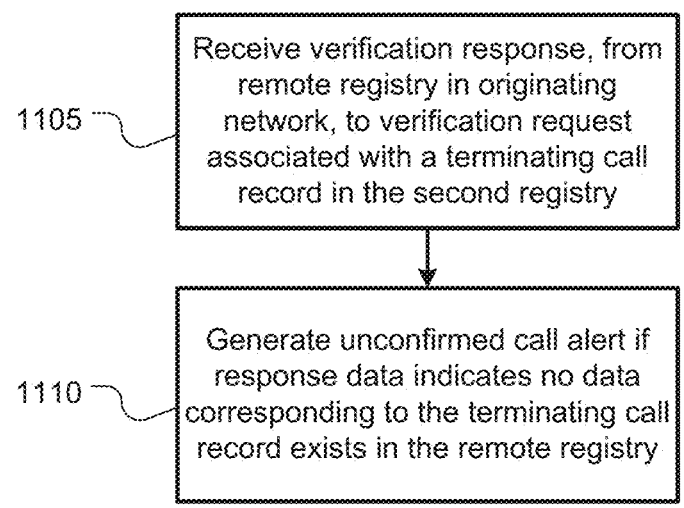
FIG. 11 is a flow chart depicting a method for processing verification responses by a call registry in a terminating call network, in accordance with embodiments of the present invention.

FIG. 11 is a flow chart depicting a method for processing verification requests by a call registry in a terminating call network, in accordance with embodiments of the present invention. The call registry (local registry) is communicatively coupled to a call switching device in the terminating call network. In some embodiments, the method of FIG. 11 is performed by the second call registry 113 of FIG. 1.

The method begins at step 1105 by the local registry receiving, from a remote registry in an originating call network, a verification response. The receipt of the verification response is based on a verification request sent by the local registry to verify a call signal received by the communicatively coupled call switching device from the originating call network. The call data of this call signal is stored in the local registry as a terminating call record. The verification response contains, as response data, the call data in the call signal sent by the originating call network.

At step 1110, the method checks if the response data for an indication of no data corresponding to the terminating call record exists in the remote registry. If such indication is present, the method generates an unconfirmed call alert that is transmitted to the communicatively coupled switching device to take action with respect to the alert.

Detecting SMS Parameter Manipulation

Figure 12:
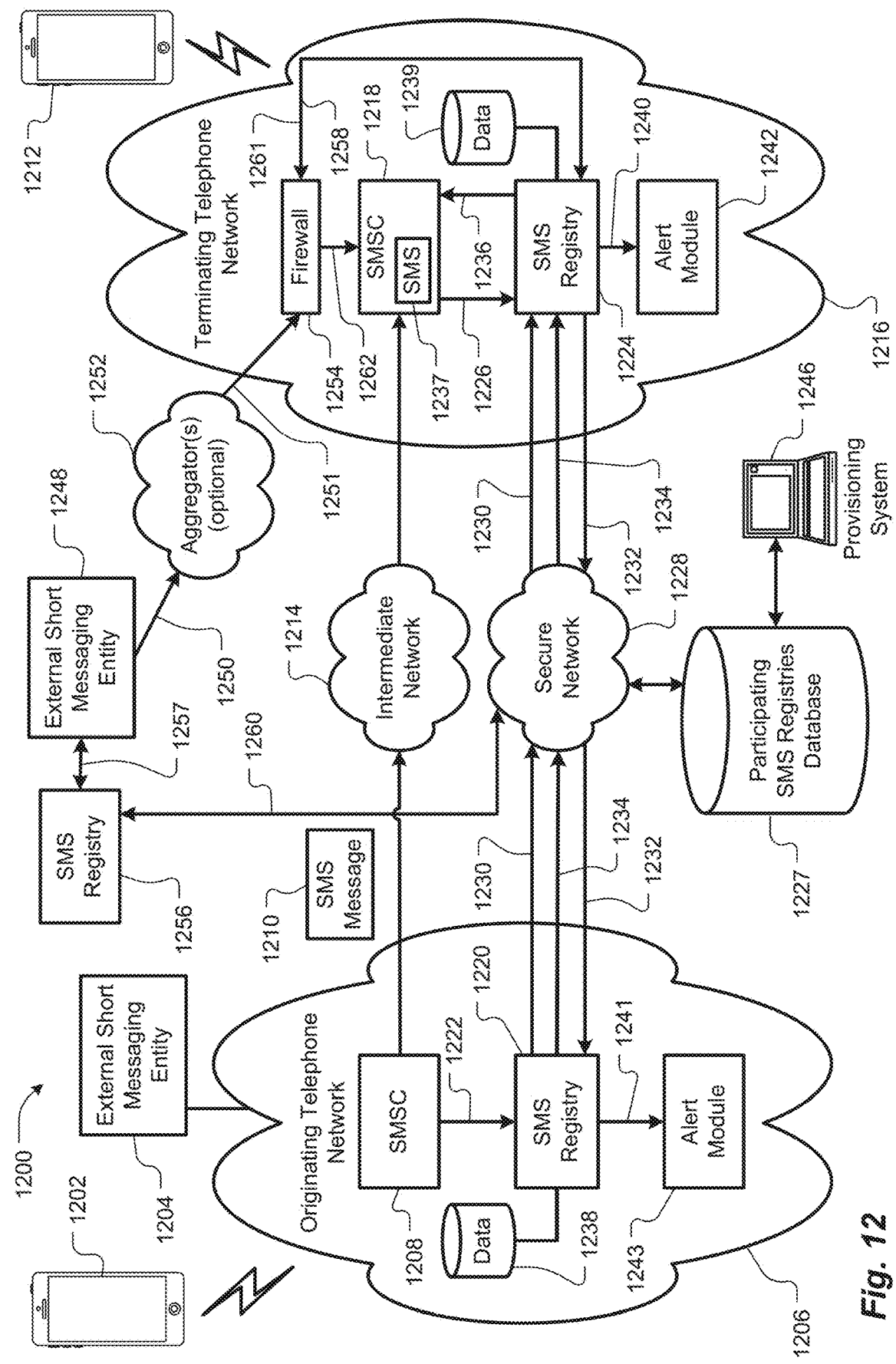
FIG. 12 is a schematic block diagram of a system for detecting SMS parameter manipulation, according to several embodiments of the present invention.

As noted, some embodiments of the present invention are directed to detecting SMS parameters manipulation. Some embodiments provide SMS registries, which compare sent and received SMS messages to automatically detect SMS parameter manipulation that occurs between the times the messages are sent and received. The SMS registries may communicate with each other over encrypted out-of-band channels. Some embodiments include firewalls. In some such embodiments, the SMS registries compare the sent and received SMS messages to automatically detect SMS parameter manipulation and instruct the firewall whether to admit or reject respective SMS messages. In other such embodiments, the firewall performs the comparisons. FIG. 12 is a schematic block diagram of a system 1200 for detecting SMS parameter manipulation, according to several embodiments of the present invention. Some elements in FIG. 12 are present in only certain embodiments, i.e., not all elements shown in FIG. 12 are necessarily present in any given embodiment.

SMS Message Sent from a Telephone Network

In one embodiment, a suitable mobile telephone 1202, External Short Messaging Entity (ESME) 1204 or other device (not shown) sends an SMS message in or via an originating telephone network 1206, such as a cellular telephone network. A Short Message Service Center (SMSC) or other suitable device (collectively referred to herein as an SMSC 1208) in the originating telephone network 1206 originates the SMS message 1210.

If the SMS message 1210 is destined to a telephone 1212 in another telephone network, the SMSC 1208 forwards the SMS message 1210, possibly via one or more intermediate networks, represented by intermediate network 1214, to the other network. The intermediate network(s) 1214 can, but need not necessarily, include the Internet, one or more private communication networks, and/or one or more other telephone carrier networks.

The telephone network in which the destination telephone 1212 is currently operating is referred to herein as the terminating telephone network 1216. An SMSC 1218 in the terminating telephone network 1216 stores a copy of the SMS message 1210 and, if the destination telephone 1212 is available, the SMSC 1218 delivers the SMS message 1210 to the destination telephone 1212. If an SMSC 1218 delivers an SMS message 1210 to the destination telephone 1212, or stores the SMS message 1210 for later delivery to the destination telephone 1212, the SMS message 1210 is referred to herein as having been "terminated at the SMSC" 1218.

An SMS registry 1220 is disposed within the originating telephone network 1206. The SMS registry 1220 is communicably coupled to the SMSC 1208 of the originating telephone network 1206. When the SMSC 1208 originates an SMS message, such as SMS message 1210, the SMSC 1208 is configured to send information 1222 (referred to as "first information," to distinguish it from other information described below) about the SMS message 1210 to the SMS registry 1220. The first information represents a status of the SMS message 1210 before the SMS message 1210 entered the terminating telephone network 1216.

The first information 1222 may, for example, include any combination of: a sending party telephone number (ex., a telephone number of the originating mobile telephone 1202), an identifier of an external short messaging entity 1204 that initiated the SMS message, a telephone number or other identifier of an intended receiving party of the SMS message (ex., a telephone number of the destination mobile telephone 1212), a portion of a message payload of the SMS message 1210, a hash of at least a portion of the message payload of the SMS message 1210, and/or other information that may be used to identify the SMS message 1210, detect a difference between the SMS message 1210 as sent by the originating telephone 1202 and as delivered to the destination telephone 1212, and/or information in the SMS message 1210 that a fraudster may try to modify. Each telephone number in the first information 1222 may, but need not necessarily, include a Mobile Network Code (MNC) and/or a Mobile Country Code (MCC).

Another SMS registry 1224 is disposed within the terminating telephone network 1216. The other SMS registry 1224 is communicably coupled to the SMSC 1218 of the terminating telephone network 1216. When the SMSC 1218 receives an SMS message, such as SMS message 1210, the SMSC 1218 is configured to send information 1226 (referred to as "second information," to distinguish it from the first information 1222) about the SMS message 1210 to the SMS registry 1224. The second information about the SMS message 1210 represents a status of the SMS message 1210 after the SMS message 1210 entered the terminating telephone network 1216.

The second information 1226 may, for example, include any combination of: a sending party telephone number (ex., a telephone number of the originating mobile telephone 1202), an identifier of an external short messaging entity 1204 that initiated the SMS message, a telephone number or other identifier of an intended receiving party of the SMS message 1210 (ex., a telephone number of the destination mobile telephone 1212), a portion of a message payload of the SMS message 1210, a hash of at least a portion of the message payload of the SMS message 1210, and/or other information that may be used to identify the SMS message 1210, detect a difference between the SMS message 1210 as sent by the originating telephone 1202 and as delivered to the destination telephone 1212, and/or information in the SMS message 1210 that a fraudster may try to modify. Each telephone number in the first information 1222 may, but need not necessarily, include a Mobile Network Code (MNC) and/or a Mobile Country Code (MCC).

The two SMS registries 1220 and 1224 communicate with each other via a secure network 1228 to compare respective at least portions of the first information 1222 and the second information 1226 to detect manipulation that may have occurred to the SMS message 1210 en route between the originating SMSC 1208 and the destination SMSC 1218. Each SMS registry 1220, 1224 has a respective network addresses, such as an Internet Protocol (IP) addresses or any other suitable network addresses sufficient to enable another SMS registry, such as SMS registry 1224 or 1220, to send a message to it. An SMS registry 1220 or 1224 can ascertain a network address, such as an IP address, of another SMS registry 1224 or 1220 from one or more databases 1238, 1239 and/or 1227, as described herein.

Communications between the two SMS registries 1220 and 1224 may, but need not necessarily, be encrypted. The communications between the two SMS registries 1220 and 1224 may, but need not necessarily, be carried over an out-of-band channel, i.e., a channel different from a channel over which the SMS message 1210 is carried through the intermediate network 1214. The communications between the two SMS registries 1220 and 1224 may, but need not necessarily, be carried over the same network(s), or a portion of the same network(s), as the intermediate network 1214, for example with suitable encryption. A channel provided by a virtual private network (VPN) that tunnels through the same network over which the SMS message 1210 is carried is considered different from the channel over which the SMS message 1210 is carried.

The SMS registry 1220 in the originating telephone network 1206 sends the first information 1222 to the SMS registry 1224 in the terminating telephone network, as indicated by arrows 1230. The first information 1222 is sent to the other SMS registry 1224 along with the network address, such as an IP address, of the sending SMS registry 1220. Similarly, the SMS registry 1224 in the terminating telephone network 1216 sends the second information 1226 to the SMS registry 1220 in the originating telephone network 1206, as indicated by arrows 1232. The second information 1226 is sent to the SMS registry 1220 along with a network address, such as an IP address, of the sending SMS registry 1224.

In some embodiments, each SMS registry 1220 and 1224 automatically compares at least a portion of the first information 1222 to a corresponding at least a portion of the second information 1226. If a fraudster manipulated the SMS message 1210 en route, the compared at least portions would be different. If, as a result of the comparison, one of the SMS registries 1220 or 1224 detects a difference between the at least a portion of the first information 1222 and the corresponding at least a portion of the second information 1226, the SMS registry 1220 or 1224 automatically sends a signal indicating SMS parameter manipulation.

If the SMS registry 1220 in the originating telephone network 1206 detects the difference, the SMS registry 1220 sends the signal to the SMS registry 1224 in the terminating telephone network 1216, as indicated by arrows 1234, and the SMS registry 1224 in the terminating telephone network 1216 sends a signal 1236 to the SMSC 1218 to inform the SMSC 1218 of the SMS parameter manipulation.

If the SMS registry 1224 in the terminating telephone network 1216 detects the difference, the SMS registry 1224 sends the signal 1236 to the SMSC 1218 to inform the SMSC 1218 of the SMS parameter manipulation.

In response to receiving the signal 1236 indicating at least some SMS parameter of the SMS message 1210 was manipulated, the SMSC 1218 can take appropriate action. For example, the SMSC 1218 may restore the manipulated SMS parameter(s) to their original value(s) to create a restored SMS message 1237 and proceed in the normal manner to store the restored SMS message 1237 and deliver the restored SMS message 1237 to the recipient telephone 1212, optionally with a warning or error message to the recipient telephone 1212 indicating that an SMS parameter had been manipulated. Optionally or alternatively, the SMSC 1218 may delete the SMS message 1210, optionally with a warning or error message to the intended recipient telephone 1212. Optionally or alternatively, the SMSC 1218 may proceed in the normal manner to store the manipulated SMS message 1210 and deliver the manipulated SMS message 1210 to the recipient telephone 1212, with a warning or error message to the recipient telephone 1212 indicating that an SMS parameter had been manipulated.

Optionally, if, as a result of the comparison, one of the SMS registries 1220 or 1224 detects a difference between the at least a portion of the first information 1222 and the corresponding at least a portion of the second information 1226, the SMS registry 1224 and/or 1220 automatically sends a signal 1240 and/or 1241 to an optional alert module 1242 in the terminating telephone network 1216 and/or an optional alert module 1243 in the originating telephone network 1206.

The signal 1240 and/or 1241 indicates SMS parameter manipulation has been detected. The alert module 1242 and/or 1243 may be configured with a respective one or more communication interfaces to one or more external systems (not shown) to send messages to users, administrators, network operators, and/or other electronic systems to notify them of the detected SMS parameter manipulation. Exemplary external systems include, without limitations, e-mail systems, web interfaces, and messaging application systems, such as Slack or Whatsapp.

Some embodiments notify an operator of the originating telephone network 1206 of a detected SMS parameter manipulation; some embodiments notify an operator of the terminating telephone network 1216; and some embodiments notify operators of both the originating and the terminating telephone networks 1206 and 1216. Since generally the operator of the originating telephone network 1206 pays for carriage of an SMS message, the operator should know that a message is delivered and the message is delivered without unwanted change to the message. The operator of the terminating telephone network 1216 should know that a message is authentic, to avoid delivery of fraudulent messages to its customers.

Each SMS registry 1220 and 1224 may be coupled to an associated database 1238 and 1239, respectively. These databases 1238 and 1239 facilitate the SMS registries 1220 and 1224 communicating with each other. Each database 1238 and 1239 is configured to store network addresses of other SMS registries 1224, 1220 in association with identifiers of SMS message senders or intended receivers and/or the telephone networks 1206, 1216 of these SMS message senders or intended receivers. The network addresses of the SMS registries 1220 and 1224 may, for example, be Internet Protocol (IP) addresses or any other suitable network addresses sufficient to enable another SMS registry to send 1230 or 1232 the first or second information 1222 or 1226 to the SMS registry 1220 or 1224. The identifiers of SMS message senders or intended receivers and/or the telephone networks 1206, 1216 of these SMS message senders or intended receivers need not necessarily uniquely identify an entity. For example, an identifiers of an SMS message sender may contain a subnet address, which is common among a number of identifiers of potential SMS message senders. Such a subnet address can be used to associate any SMS message sender in the subnet with a corresponding SMS registry 1220, 1224 or 1256. An identifier of an SMS message sender may contain a URL. The SMS Registry can perform a partial match. Thus, for example, an SMS message identifier of "booking.com" would match "www.booking.com" and "ftp.booking.com." Similarly, "booking" would match "booking.com" and "booking.net." An SMS registry 1220, 1224 or 1256 can match all or a portion of an identifier of an SMS message sender with the subnet address in the database 1238 or 1239.

Each SMS message sender or intended receiver identifier may include a Mobile Network Code (MNC) of a respective home mobile telephone network 1206 or 1216 of the SMS message sender or intended receiver 1202 or 1212 or an identifier of a sending ESME 1248. Each SMS message sender or intended receiver identifier may further include a Mobile Country Code (MCC) of the respective home mobile telephone network 1206 or 1216 of the SMS message sender or intended receiver 1202 or 1212. Optionally or alternatively, each SMS message sender identifier may include a SMS Sender ID of a respective SMS message sender 1202 or 1212.

An identifier of a sending ESME 1248 may include all or a portion of a domain name, URL or other identifier associated with the ESME 1248. The sending ESME 1248 may have an associated SMS registry 1256, which has an associated IP address. Thus, the database 1238 and/or 1239 may contain a record that associates the ESME 1248 full or partial domain name, URL, etc. with the IP address of the SMS registry 1256.

Thus, when processing a SMS message, an SMS registry 1220 or 1224 can search a corresponding database 1238 or 1239 for the Mobile Network Code (MNC) and/or Mobile Country Code (MCC) or other identifier of an SMS sender or intended receiver to ascertain the network address, such as an IP address, of the corresponding SMS registry 1220, 1224 or 1256.

The databases 1238 and 1239 may be provisioned by respective operators of the telephone networks 1206 and 1216. For example, an operator of one telephone network 1206 may send an e-mail message to an operator of the other telephone network 1216, in which the e-mail message identifies the sending telephone network 1206 and the network address of the SMS registry 1220 of the sending telephone network 1206. Upon receipt of the e-mail message, the operator of the receiving telephone network 1216 enters the information from the e-mail message into the database 1239.

Optionally or alternatively, one or more of the SMS registries 1220 and/or 1224 may be configured to automatically discover a network address of the other SMS registry 1224 and/or 1220 and store the discovered network address (es) in the respective database 1236 or 1238. For example, if an SMS registry 1220 or 1224 receives information, such as first information 1222 or second information 1226, from another SMS registry, such as SMS registry 1224 or 1220, the message carrying the information 1222 or 1226 includes an IP address of the sending SMS registry 1224 or 1220, as well as an identifier of the mobile telephone network 1216 or 1206 in which the sending SMS registry 1224 or 1220 resides. The receiving SMS registry 1220 or 1224 may add the IP address of the sending SMS registry 1224 or 1220 to its database 1238 or 1239, in association with the identifier of the mobile telephone network 1216 or 1206 in which the sending SMS registry 1224 or 1220 resides. As noted, an identifier of a mobile telephone network 1206 or 1216 may include a Mobile Network Code (MNC) and/or a Mobile Country Code (MCC) of the respective mobile telephone network 1206 or 1216, and an identifier of a sending ESME 1248 may include a full or partial domain name or other URL of the ESME 1248.

Optionally, a participating SMS registries database 1227 is provisioned, such as via a provisioning system 1246, by one or more telephone network operators or other parties with information that associates identifiers of mobile telephone networks 1206 or 1216 or external senders 1248 with network addresses, such as IP addresses, of SMS registries 1220, 1224, or 1256 that reside in the respective telephone networks 1206, 1216 or logically near the ESME 1248. As noted, an identifier of a mobile telephone network 1206 or 1216 may include a Mobile Network Code (MNC) and/or a Mobile Country Code (MCC) of the respective mobile telephone network 1206 or 1216. Optionally, one or more SMS registries 1220, 1224, 1256 may use the participating SMS registries database 1227 when sending messages to other SMS registries 1224, 1220, or populate their own respective databases 1238, 1239 from the participating SMS registries database 1227.

Thus, according to an embodiment of the present invention, a system 1200 for detecting SMS parameters manipulation includes a first SMS registry. In this context, the "first SMS registry" may be in the terminating telephone network 1216 or outside the terminating telephone network 1216. For example, the first SMS registry may be the SMS registry 1224 in the terminating telephone network 1216, or the SMS registry 1220 in the originating telephone network 1206, or the SMS registry 1256 associated with the ESME 1248.

The first SMS registry is configured to be communicably coupled to a first Short Message Service Center (SMSC), such as SMSC 1218, that is disposed in the terminating telephone network 1216. The coupling may be direct or indirect. For example, the SMS registry 1224 is directly coupled to the SMSC 1218, as indicated at 1226 and/or 1236. The SMS registries 1220 and 1256 are indirectly coupled to the SMSC 1218, via the SMS registry 1224.

The first SMS registry is configured to receive first information 1222 about an SMS message, for example SMS message 1210 or an SMS message from the ESME 1248, destined to the first SMSC 1218. The first information 1222 represents a status of the SMS message before the SMS message enters the terminating telephone network 1216. If the first SMS registry is in the terminating telephone network 1216, the first information 1222 may be sent by the SMS registry 1220 in the originating telephone network 1206, or the SMS registry 1256 associated with the ESME 1248. If the first SMS registry is outside the terminating telephone network 1216, for example if the first SMS registry is the SMS registry 1220, the first information 1222 may be sent by the SMS registry 1224 in the terminating telephone network 1216.

The first SMS registry is also configured receive second information 1226 about the SMS message. The second information 1226 represents a status of the SMS message after the SMS message enters the terminating telephone network 1216. If the first SMS registry is in the terminating telephone network 1216, the second information 1226 may be sent by the SMSC 1218 in the terminating telephone network 1216. If the first SMS registry is outside the terminating telephone network 1216, the second information 1226 may be sent by the SMS registry 1224 or the SMSC 1218 in the terminating telephone network 1216.

The first SMS registry is also configured to automatically compare at least a portion of the first information to a corresponding at least a portion of the second information. As a result of the comparison, in response to detecting a difference between the at least portion of the first information and the corresponding at least portion of the second information, the first SMS registry is configured automatically send a first signal indicating SMS parameter manipulation.

SMS Message Sent from Outside a Telephone Network

Some external short messaging entities, such as booking-.com and exemplified by ESME 1248, generate and send SMS messages, using the Short Message Peer-to-Peer (SMPP) protocol 1250, directly 1251 to terminating telephone networks 1216, i.e., without traversing another telephone network, such as telephone network 1206. In some cases, these SMS messages are carried via one or more "aggregator" networks 1252, which may provide application programming interfaces (APIs) to the ESME 1248.

In some embodiments, a firewall 1254 protects the SMSC 1218 at the terminating telephone network 1216 from modified SMS messages. In some embodiments, the ESME 1248 has an associated SMS registry 1256, which co-operates (largely as described with reference to the SMS registry 1220 in the originating telephone network 1206) with the SMS registry 1224 in the terminating telephone network 1216 to detect SMS parameter modification. In some embodiments, the firewall 1254 performs the comparison.

ESME with an Associated SMS Registry

In embodiments in which the ESME 1248 has an associated SMS registry 1256, the SMS registry 1256 operates largely as described with reference to the SMS registry 1220 in the originating telephone network 1206. Thus, the SMS registry 1256 communicates 1260 and co-operates with the SMS registry 1224 in the terminating telephone network 1216 to detect SMS parameter modification. For example, when the ESME 1248 originates an SMS message, the ESME 1248 is configured to send 1257 the first information to the SMS registry 1256.

The firewall 1254 is communicably coupled 1258 to the SMS registry 1224 and to the SMSC 1218. When the firewall 1254 receives 1251 an SMS message, the firewall 1254 is configured to send 1258 the second information to the SMS registry 1224. The two SMS registries 1256 and 1224 communicate 1260 with each other via the secure network 1228 to compare respective at least portions of the first information and the second information to detect manipulation that may have occurred to the SMS message en route, between the ESME 1248 and the firewall 1254, as discussed with respect to the SMS registries 1220 and 1224. In some embodiments, the SMS registry 1224 forwards the first information to the firewall 1254, and the firewall 1254 performs the comparison.

If, as a result of the comparison, one of the SMS registries 1256 or 1224 or the firewall 1254 detects a difference between the at least a portion of the first information and the corresponding at least a portion of the second information, the SMS registry 1256 or 1224, or the firewall 1254, automatically sends a signal indicating SMS parameter manipulation. On the other hand, if no SMS parameter manipulation is detected, the firewall 1254 passes 1262 the SMS message to the SMSC 1218 for storage and/or delivery to the recipient telephone 1212. In embodiments in which the SMS registry 1256 and/or 1224 performs the comparison, the SMS registry 1256 and/or 1224 instructs the firewall 1254 whether to pass the SMS message to the SMSC 1218.

In some embodiments, only the SMS registry 1224 in the terminating telephone network 1216, or only the firewall 1254, performs the comparison, i.e., in these embodiments, the SMS registry 1256 associated with the ESME 1248 does not perform the comparison.

In other respects, the SMS registry 1256 is configured and operates similarly to the SMS registry 1220. For example, the SMS registry 1256 may have an associated database (not shown) of network addresses of other SMS registries 1220, 1224, optionally in association with identifiers of SMS message senders or intended receivers and/or the telephone networks 1206, 1216 of these SMS message senders or intended receivers, similar to the database 1238. Similarly, the SMS registry 1256 may access and use the participating SMS registries database 1227 as discussed herein.

As noted, the database 1238 and/or 1239 may contain records that associate ESME 1248 domain names, URLs, or other identifiers of SMS message senders with the IP addresses of their associated SMS registries 1256. Thus, when processing an SMS message, the SMS registry 1224 can search its database 1239 for the sender identification of a sender (ex., ESME 1248) that sent the SMS message and, thereby, retrieve the associated network address, such as an IP address, of the SMS registry 1256 that corresponds to the SMS message sender.

SMS Network Element

Figure 13:
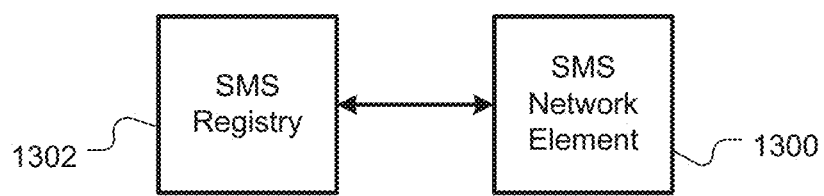
FIG. 13 is a portion of FIG. 12, however showing a single SMS network element, according to embodiments of the present invention.

As noted, SMS parameter manipulation can be detected by: (a) a pair of co-operating SMS registries 1220, 1225 and/or 1256 that compares at least portions of an SMS message to detect manipulation or (b) a firewall 1254. Collectively, the network elements that process SMS messages en route from a sender to a receiver, i.e., the SMSC 1208 and 1218, the ESME 1248, and the firewall 1254, are referred to herein as "SMS network elements" 1300, as shown in FIG. 13. An SMS registry 1220, 1224 or 1256 (represented by SMS registry 1302 in FIG. 13) can be coupled to, and co-operate with, an SMS network element 1300, as described herein.

Although FIG. 12 shows two telephone networks 1206 and 1216, each with an associated SMSC 1208 and 1218 and an associated SMS registry 1220 and 1224, additional telephone networks (not shown), each with its associated SMSC and SMS registry may be interconnected with the two telephone networks 1206 and 1216. The SMSCs and SMS registries in these additional telephone networks operate as described herein.

Figure 14:
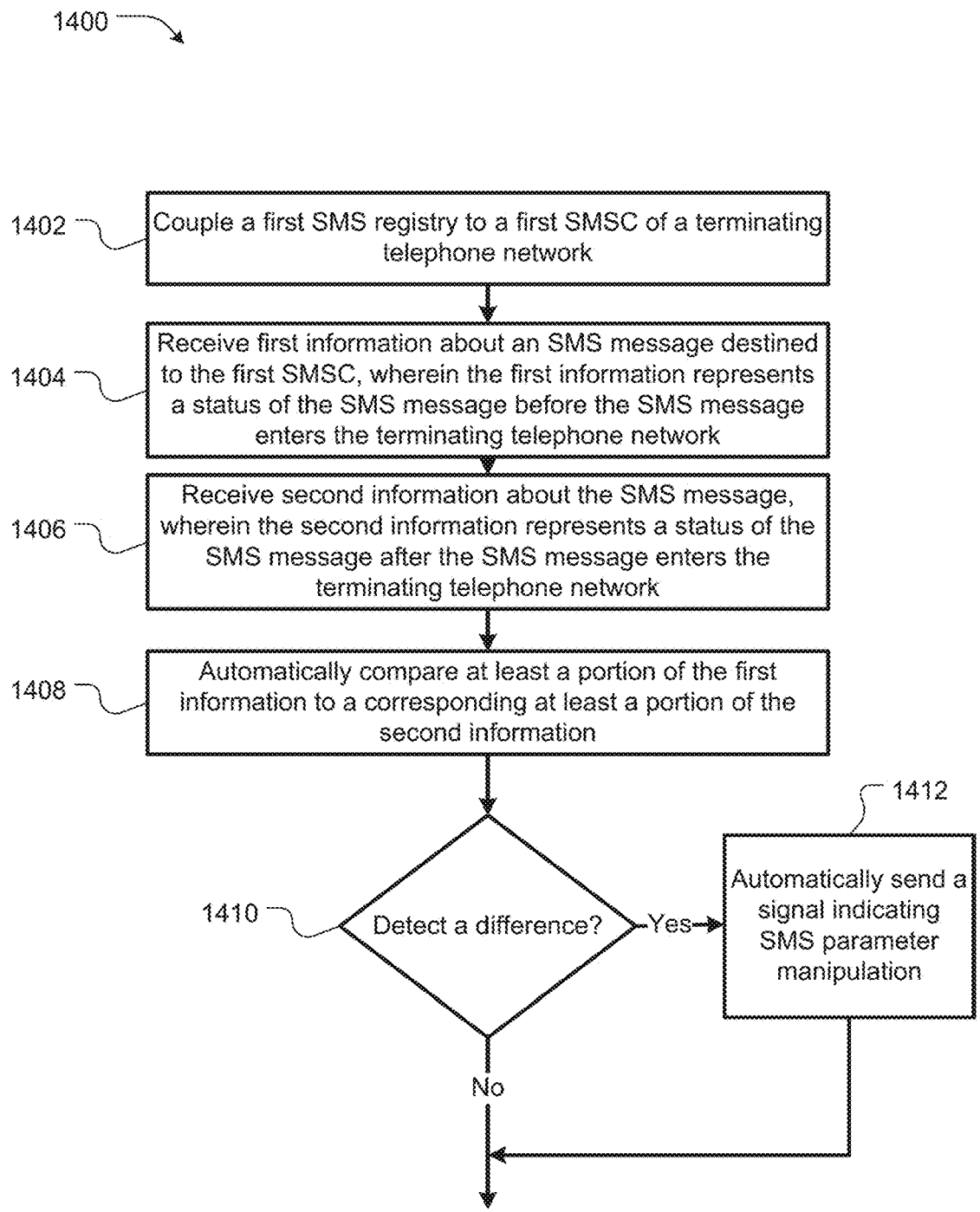
FIG. 14 is a flowchart that schematically illustrates a method for detecting SMS parameters manipulation, according to an embodiment of the present invention.

FIG. 14 is a flowchart that schematically illustrates a method 1400 for detecting SMS parameters manipulation, according to an embodiment of the present invention. At 1402, a first SMS registry 1220 or 1224 or 1256 is communicably coupled to a first Short Message Service Center (SMSC) 1218 of a terminating telephone network 1216.

At 1404, first information 1222 about an SMS message 1210 destined to the first SMSC 1218 is received by the first SMS registry 1220 or 1224 or 1256. The first information 1222 represents a status of the SMS message 1210 before the SMS message 1220 enters the terminating telephone network 1216.

If the first SMS registry 1224 is in the terminating telephone network 1216, the sender of the first information 1222 could be an SMS registry 1220 in the originating telephone network 1206, or the sender could be an SMS registry that is not in any telephone network, such as the SMS registry 1256 associated with the ESME 1248. If the first SMS registry 1220 or 1256 is outside the terminating telephone network 1216, the sender could be an SMS registry in the terminating telephone network 1216, such as the SMS registry 1224.

At 1406, second information 1226 about the SMS message 1210 is received by the first SMS registry 1220 or 1224 or 1256. The second information 1226 represents a status of the SMS message 1210 after the SMS message 1210 enters the terminating telephone network 1216.

If the first SMS registry 1224 is in the terminating telephone network 1216, the sender of the second information 1226 could be an SMSC 1218 in the terminating telephone network 1216. If the first SMS registry 1220 or 1256 is outside the terminating telephone network 1216, the sender of the second information 1226 could be an SMS registry 1224 or an SMSC 1218 in the terminating telephone network 1216.

At 1408, the first SMS registry 1220 automatically compares at least a portion of the first information 1222 to a corresponding at least a portion of the second information 1226. At 1410, if a difference is detected, control passes to 1412. Thus, at 1412, as a result of the comparison 1408, in response to detecting a difference between the at least a portion of the first information 1222 and the corresponding at least a portion of the second information 1226, at 1412, a signal 1274 indicating SMS parameter manipulation is automatically sent by the SMS registry 1220.

While the invention is described through the above-described exemplary embodiments, modifications to, and variations of, the illustrated embodiments may be made without departing from the inventive concepts disclosed herein. For example, although specific parameter values, such as fields and/or parameters of an SMS message, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The SMS registries 1220, 1224 and/or 1256, the alert modules 1242 and 1243, the databases 1227, 1238 and/or 1239, the firewall 1254, etc. or portions thereof may be implemented by one or more suitable processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), non-volatile memory (NVM), non-volatile random access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, ordinal modifiers, such as "first," "second" and "third," are used to distinguish respective telephone networks, SMSCs, SMS registries, and information from one another and are not intended to indicate any particular order or total number of telephone networks, SMSCs, SMS registries or information in any particular embodiment. Thus, for example, a given embodiment may include only a second SMS registry and a third SMS registry.

What is claimed is:

1. A system for detecting SMS parameters manipulation relating to an SMS message carried between an External Short Messaging Entity (ESME) and a terminating telephone network, the system comprising:
 a first SMS registry configured to:
  be communicably coupled to a first Short Message Service Center (SMSC) disposed in the terminating telephone network;
  receive first information about the SMS message destined to the first SMSC, wherein the first information represents a status of the SMS message before the SMS message enters the terminating telephone network and includes at least an identifier of the ESME that sent the SMS message and a portion of a message payload of the SMS message;

receive second information about the SMS message, wherein the second information represents a status of the SMS message after the SMS message enters the terminating telephone network;

automatically compare at least a portion of the first information to a corresponding at least a portion of the second information, wherein the at least a portion of the first information includes at least one of the identifier of the ESME that sent the SMS message and the portion of the message payload of the SMS message; and as a result of the comparison, in response to detecting a difference between the at least a portion of the first information and the corresponding at least portion of the second information, automatically send a first signal indicating SMS parameter manipulation; and a firewall:
  disposed within the terminating telephone network;
  communicably coupled between the ESME and the first SMSC;
  configured to receive the SMS message; and
  configured to selectively transfer the SMS message to the first SMSC unless the first signal has been sent.

2. A system according to claim 1, wherein the at least a portion of the first information further comprises a telephone number of an intended receiving party of the SMS message.

3. A system according to claim 1, wherein the at least a portion of the first information further comprises a hash of at least a portion of a message payload of the SMS message.

4. A system according to claim 1, wherein the first SMS registry is configured to receive the first information via an encrypted communication channel.

5. A system according to claim 1, further comprising:
  a database coupled to the first SMS registry and configured to store network addresses of respective SMS registries in association with respective SMS message sender identifiers;
  wherein the first SMS registry is configured to:
    extract an SMS message sender identifier from the SMS message; and
    access the database to automatically ascertain a network address of an SMS registry associated with the extracted SMS message sender identifier.

6. A system according to claim 1, wherein the first SMS registry is disposed within the terminating telephone network.

7. A system for detecting SMS parameters manipulation, the system comprising:
  an SMS registry that is:
    disposed in a terminating telephone network;
    communicably coupled to a Short Message Service Center (SMSC) disposed in the terminating telephone network; and
    configured to receive first information about an SMS message sent by an External Short Messaging Entity (ESME) disposed outside the terminating telephone network and destined to the SMSC, wherein the first information represents a status of the SMS message before the SMS message enters the terminating telephone network and includes at least an identifier of the ESME that sent the SMS message and a portion of a message payload of the SMS message; and a firewall that is:
    disposed in the terminating telephone network;
    communicably coupled between the ESME and the SMSC;
    configured to receive the SMS message; and
    send second information about the SMS message to the SMS registry, wherein the second information represents a status of the SMS message after the SMS message enters the terminating telephone network; wherein:
  the SMS registry is configured to:
    automatically compare at least a portion of the first information to a corresponding at least a portion of the second information, wherein the at least a portion of the first information includes at least one of the identifier of the ESME that sent the SMS message and the portion of the message payload of the SMS message; and
    as a result of the comparison, in response to detecting a difference between the at least portion of the first information and the corresponding at least portion of the second information, automatically send an indication of SMS parameter manipulation to the firewall; and
  the firewall is configured to selectively transfer the SMS message to the SMSC in response to absence of the indication of SMS parameter manipulation.

8. A system for detecting SMS parameters manipulation, the system comprising:
  a firewall that is:
    disposed in a terminating telephone network;
    configured to receive an SMS message sent by an External Short Messaging Entity (ESME) disposed outside the terminating telephone network; and
  an SMS registry that is:
    disposed in the terminating telephone network; and
    configured to:
      receive first information about the SMS message, wherein the first information represents a status of the SMS message before the SMS message enters the terminating telephone network and includes at least an identifier of the ESME that sent the SMS message and a portion of a message payload of the SMS message; and
      send the first information to the firewall; wherein:
  the firewall is configured to:
    generate second information about the SMS message, wherein the second information represents a status of the SMS message after the SMS message enters the terminating telephone network;
    automatically compare at least a portion of the first information to a corresponding at least a portion of the second information, wherein the at least a portion of the first information includes at least one of the identifier of the ESME that sent the SMS message and the portion of the message payload of the SMS message; and
    as a result of the comparison, in response to detecting no difference between the at least portion of the first information and the corresponding at least portion of the second information, automatically transfer the SMS message.

9. A system according to claim 8, wherein the firewall is configured to, as a result of the comparison, in response to detecting a difference between the at least portion of the first information and the corresponding at least portion of the second information, automatically send an indication of SMS parameter manipulation.

10. A method for detecting SMS parameters manipulation relating to an SMS message carried between an External Short Messaging Entity (ESME) and a terminating network, the method comprising:
- receiving the SMS message at a firewall disposed within the terminating telephone network;
- communicably coupling a first SMS registry to a first Short Message Service Center (SMSC) disposed in the terminating telephone network, wherein the firewall is communicably coupled between the ESME and the first SMSC;
- receiving, by the first SMS registry, first information about the SMS message, wherein the first information represents a status of the SMS message before the SMS message enters the terminating telephone network and includes at least an identifier of the ESME that sent the SMS message and a portion of a message payload of the SMS message;
- receiving, by the first SMS registry, second information about the SMS message, wherein the second information represents a status of the SMS message after the SMS message enters the terminating telephone network;
- automatically comparing at least a portion of the first information to a corresponding at least a portion of the second information, wherein the at least a portion of the first information includes at least one of the identifier of the ESME that sent the SMS message and the portion of the message payload of the SMS message; and
- as a result of the comparison, in response to detecting a difference between the at least portion of the first information and the corresponding at least portion of the second information, automatically sending a first signal indicating SMS parameter manipulation and in absence of the first signal, the firewall selectively transferring the SMS message to the first SMSC.

11. A method according to claim 10, wherein the at least a portion of the first information further comprises a telephone number of an intended receiving party of the SMS message.

12. A method according to claim 10, wherein the at least a portion of the first information further comprises a hash of at least a portion of a message payload of the SMS message.

13. A method according to claim 10, wherein receiving the first information comprises receiving by the first SMS registry, the first information via an encrypted communication channel.

14. A non-transitory computer-readable medium encoded with instructions that, when executed by a processor, establish processes for performing a computer-implemented method of detecting SMS parameters manipulation relating to an SMS message carried between an External Short Messaging Entity (ESME) and a firewall disposed in a terminating network, the processes comprising:
- a first SMS registry process configured to:
  - be communicably coupled to a first Short Message Service Center (SMSC) disposed in the terminating telephone network;
  - receive first information about the SMS message destined to the first SMSC, wherein the first information represents a status of the SMS message before the SMS message enters the terminating telephone network and includes at least an identifier of the ESME that sent the SMS message and a portion of a message payload of the SMS message;
  - receive second information about the SMS message, wherein the second information represents a status of the SMS message after the SMS message enters the terminating telephone network;
  - automatically compare at least a portion of the first information to a corresponding at least a portion of the second information, wherein the at least a portion of the first information includes at least one of the identifier of the ESME that sent the SMS message and the portion of the message payload of the SMS message; and
  - as a result of the comparison, in response to detecting a difference between the at least portion of the first information and the corresponding at least portion of the second information, automatically send a first signal indicating SMS parameter manipulation such that in absence of the first signal, the firewall selectively transfers the SMS message to the first SMSC.

* * * * *